United States Patent [19]
Kitajima

[11] Patent Number: 5,933,393
[45] Date of Patent: Aug. 3, 1999

[54] LASER BEAM PROJECTION SURVEY APPARATUS WITH AUTOMATIC GRADE CORRECTION UNIT

[75] Inventor: Eiichi Kitajima, Yokohama, Japan

[73] Assignee: Nikon Corporation, Tokyo, Japan

[21] Appl. No.: 09/138,521

[22] Filed: Aug. 24, 1998

Related U.S. Application Data

[62] Division of application No. 08/609,865, Mar. 1, 1996, abandoned.

[30] Foreign Application Priority Data

Mar. 2, 1995 [JP] Japan .................................. 7-068816
Oct. 30, 1995 [JP] Japan .................................. 7-305021

[51] Int. Cl.$^6$ .................................................. F21V 29/00
[52] U.S. Cl. ........................ 368/268; 356/139.1; 33/276; 33/279
[58] Field of Search ................... 356/139.1, 144, 356/145, 146; 33/276, 277, 278, 279; 362/268

[56] References Cited

U.S. PATENT DOCUMENTS

| | | | |
|---|---|---|---|
| 2,921,496 | 1/1960 | Thurnheer | 356/249 |
| 3,251,262 | 5/1966 | Ellenberger | 356/250 |
| 3,655,274 | 4/1972 | Craig | 356/249 |
| 3,684,381 | 8/1972 | Zoot | 356/249 |
| 4,040,752 | 8/1977 | Tagnon | 356/249 |
| 4,666,299 | 5/1987 | Tamaki et al. | 356/249 |
| 4,993,162 | 2/1991 | Scholian | 356/249 |
| 5,218,770 | 6/1993 | Toga | 33/227 |
| 5,371,951 | 12/1994 | Piske | 356/249 |
| 5,392,112 | 2/1995 | Nakamura | 356/249 |
| 5,513,001 | 4/1996 | Ohtomo et al. | 356/249 |
| 5,619,802 | 4/1997 | Rando et al. | 33/291 |
| 5,684,579 | 11/1997 | Ohtomo et al. | 356/148 |
| 5,724,744 | 3/1998 | Bozzo | 356/250 |

FOREIGN PATENT DOCUMENTS

| | | |
|---|---|---|
| 63-222214 | 9/1988 | Japan . |
| 8-75466 | 3/1996 | Japan . |

*Primary Examiner*—Sandra O'Shea
*Assistant Examiner*—Marshall Honeyman
*Attorney, Agent, or Firm*—Vorys, Sater, Seymour and Pease LLP

[57] ABSTRACT

A laser beam projection apparatus includes a light source, a vessel containing a transparent liquid which transmits a light beam from the light source and has a free liquid surface, a condensing optical member for condensing the light beam transmitted through the vessel and the liquid to form a secondary source of the light source, and a first optical member for collimating the light beam from the secondary source into a parallel beam. The focal lengths of the condensing optical member and the first optical member are set in accordance with the refractive index of the liquid. Preferably, the focal lengths are set in accordance with the refractive index of the liquid such that the parallel beam from the first optical member emerges in the vertical direction.

4 Claims, 15 Drawing Sheets

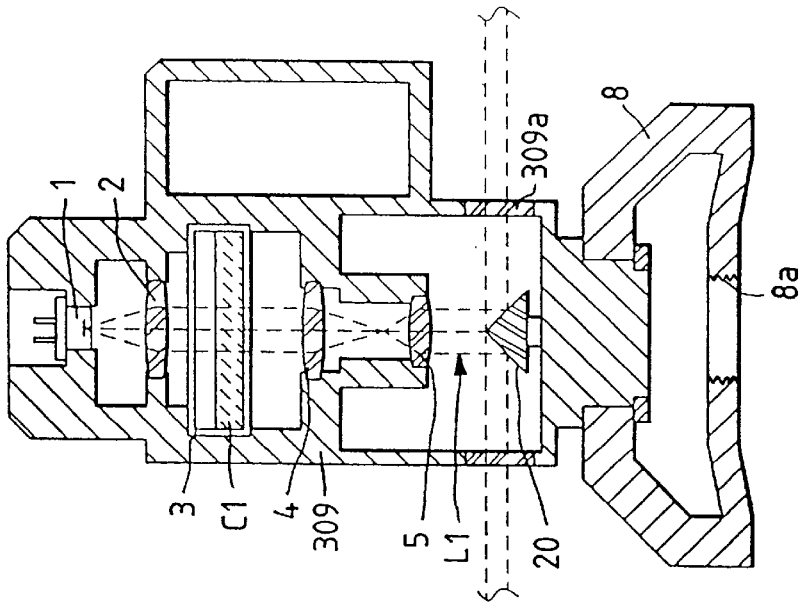
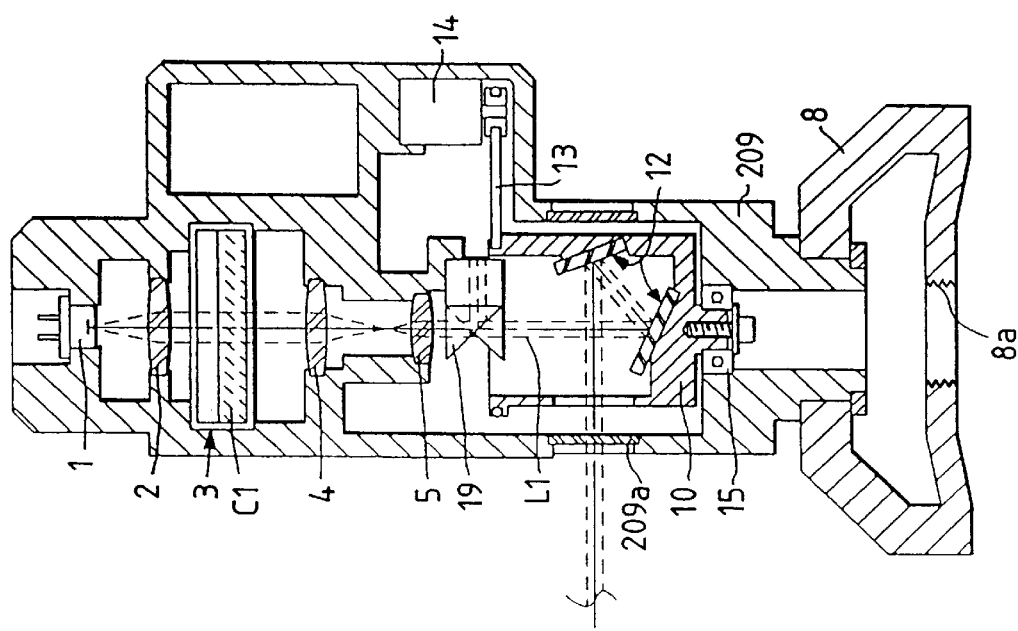

LASER BEAM PROJECTION SURVEY APPARATUS WITH AUTOMATIC GRADE CORRECTION UNIT

CROSS-REFERENCE TO RELATED APPLICATIONS

This is a division of application Ser. No. 08/609,865 filed Mar. 1, 1996 now abandoned.

BACKGROUND OF THE INVENTION

1. Field of the Invention

The present invention relates to a laser beam projection apparatus used for a setting or survey operation in construction or the like and, more particularly, to a laser beam projection apparatus having an automatic grade correction unit for automatically correcting the direction of a laser beam when the projection apparatus main body is tilted.

2. Related Background Art

As a conventional laser beam projection apparatus having an automatic grade correction unit, an apparatus shown in FIGS. 16 and 17 is known (Japanese Patent Application Laid-open No. 63-222214).

FIG. 16 is a longitudinal sectional view of a conventional laser beam projection survey apparatus having an automatic grade correction unit. FIG. 17 is a longitudinal sectional view showing a state wherein the laser beam projection survey apparatus in FIG. 16 is tilted.

A leveling unit 1108 is arranged under a laser beam projection apparatus main body 1109. A laser diode 1101 is arranged at an upper portion in the projection apparatus main body 1109 to emit a laser beam La in the lower direction. An automatic grade correction unit is arranged under the laser diode 1101.

The automatic grade correction unit has a projection lens 1102 for collimating the laser beam La emitted from the laser diode 1101 in the lower direction into a parallel beam, and a transparent vessel 1103 through which the parallel beam from the projection lens 1102 is transmitted. The interior of the transparent vessel 1103 is partitioned into two, upper and lower chambers. Silicone oils 2000 and 2001 are sealed in the chambers, and spaces 1108a and 1108b are formed at the upper portions of the respective chambers in contact with the liquid surfaces of the silicone oils 2000 and 2001. An upper flat portion 1103a, a central flat portion 1103b, and a lower flat portion 1103c of the transparent vessel 1103 are parallel to each other.

As shown in FIG. 17, when the projection apparatus main body 1109 is tilted at an angle θ, the silicone oils 2000 and 2001 in the transparent vessel 1103 form sphenoidal shapes having gradient pitches θ. The laser beam La which is emitted from the laser diode 1101 and collimated by the projection lens 1102 is refracted when the laser beam La is transmitted through the sphenoidal (or wedge-shaped) silicone oils 2000 and 2001, and is output from the projection apparatus main body 1109 as a laser beam La having a deflection angle θ'.

When the refractive indices of the silicone oils 2000 and 2001 are respectively represented by n2000 and n2001, a correction condition formula θ=(n2000 +n2001−2)θ is given. When silicone oils 2000 and 2001 with n2000= n2001=1.5 are used, grade correction of the laser beam La is realized. More specifically, the laser beam La is automatically corrected to direct in the vertical direction, so that any measurement error caused by tilt of the projection apparatus main body 1109 is corrected.

However, there is no silicone oil having an appropriate viscosity and a proper refractive index of 1.500, and in fact, silicone oil having a refractive index of 1.49 or 1.51 must be used. Therefore, if the above correction condition formula is used, the correction accuracy is degraded. On the other hand, when the automatic grade correction unit is used within a range not to degrade the correction accuracy, the correction range of the automatic grade correction unit becomes as narrow as, e.g., about ±10 minutes. As a result, a leveling operation for rotating the leveling screw 1108 while observing the bubble tube must be performed, resulting in troublesome setting of the laser beam projection apparatus.

In addition, the conventional laser beam projection apparatus projects a laser beam to form a vertical plane. For this reason, to perform a setting operation by vertical plane laser beam projection and a setting operation by horizontal plane laser beam projection, laser beam projection apparatuses dedicated to the respective operations must be prepared.

Furthermore, the laser beam La after grade correction is output only in the lower direction. Therefore, this apparatus cannot be used for an ink projection operation (an operation for transferring ink, i.e., a point on the floor to the ceiling) performed in an interior finish work or the like of a building.

SUMMARY OF THE INVENTION

It is an object of the present invention to provide a laser beam projection apparatus having an automatic grade correction unit with a wide correction range and a high correction accuracy.

The above object can be achieved by a laser beam projection apparatus comprising a light source, a vessel containing a transparent liquid which transmits a light beam from the light source and has a free liquid surface, a condensing optical member for condensing the light beam transmitted through the vessel and the liquid to form a secondary source of the light source, and a first optical member for collimating the light beam from the secondary source into a parallel beam, wherein focal lengths of the condensing optical member and the first optical member are set in accordance with a refractive index of the liquid. According to the present invention, since the grade correction range of the grade correction unit of a laser transit which outputs a laser beam in the upper vertical direction can be increased, no leveling unit for leveling the apparatus main body is needed. Therefore, the operation efficiency can be increased, and a high grade correction accuracy can be obtained.

It is another object of the present invention to provide a laser beam projection apparatus which can project a light beam to form both a vertical plane and a horizontal plane and has a high correction accuracy.

The above object can be achieved by a laser beam projection apparatus comprising a light source, a vessel containing a transparent liquid which transmits a light beam from the light source and has a free liquid surface, an optical path deflecting member for deflecting a parallel beam incident on the vessel at right angles, and a condensing optical member for condensing the parallel beam deflected by the optical path deflecting member at right angles and transmitted through the free liquid surface of the liquid or the parallel beam transmitted through the free liquid surface of the liquid and deflected by the optical path deflecting member at right angles, thereby forming the secondary source of the light source, a first optical member for collimating the light beam from the secondary source into a parallel beam, and a reflecting member for outputting the parallel beam from the first optical member in the horizontal direction, wherein focal lengths of the condensing optical member and the first optical member are set in accordance with a refractive index of the liquid.

According to the present invention, the light beam can be projected to form both a vertical plane and a horizontal plane only by changing the posture of the laser beam projection apparatus. For this reason, the setting operation can be performed both in the vertical plane and in the horizontal plane by a single apparatus, so no dedicated apparatus need be prepared. Therefore, the workability is improved, and at the same time, the operation cost can be decreased. Since the grade correction function works both in vertical plane projection and in horizontal plane projection, a high grade correction accuracy can be obtained. In addition, since a high correction accuracy can be obtained with a single vessel containing a transparent liquid and a simple optical member, the manufacturing cost can be decreased.

It is still another object of the present invention to provide a laser beam projection apparatus usable for an ink projection operation performed in an interior finish work of a building or the like.

The above object can be achieved by a laser beam projection apparatus comprising a light source for emitting a light beam, a vessel having an upper surface and a lower surface and containing a transparent liquid having a free liquid surface, an optical path deflecting member for directing the light beam from the light source to one of the upper and the lower surfaces of the vessel, and a beam splitter arranged on the other of the upper and the lower surfaces of the vessel to split the light from the light source, which is transmitted through one of the upper and the lower surfaces of the vessel and the liquid in the vessel, into a light beam in an upper direction and a light beam in a lower direction.

The light beam from the light source passes through the liquid in the vessel, and is thereafter split by the beam splitter arranged on the other of the upper and the lower surfaces of the vessel into light beams in the upper and the lower directions, so that the light beams can be output in both the upper and lower directions. Therefore, this apparatus can be used for an ink projection operation performed in an interior finish work of a building or the like.

BRIEF DESCRIPTION OF THE DRAWINGS

FIG. 5 is a longitudinal sectional view showing an application in which the automatic grade correction unit in FIG. 4 is applied to a laser leveling apparatus;

FIG. 6 is a longitudinal sectional view showing another application in which the automatic grade correction unit in FIG. 4 is applied to a laser leveling apparatus;

DESCRIPTION OF THE PREFERRED EMBODIMENTS

The embodiments of the present invention will be described below with reference to the accompanying drawings.

Figure 1:
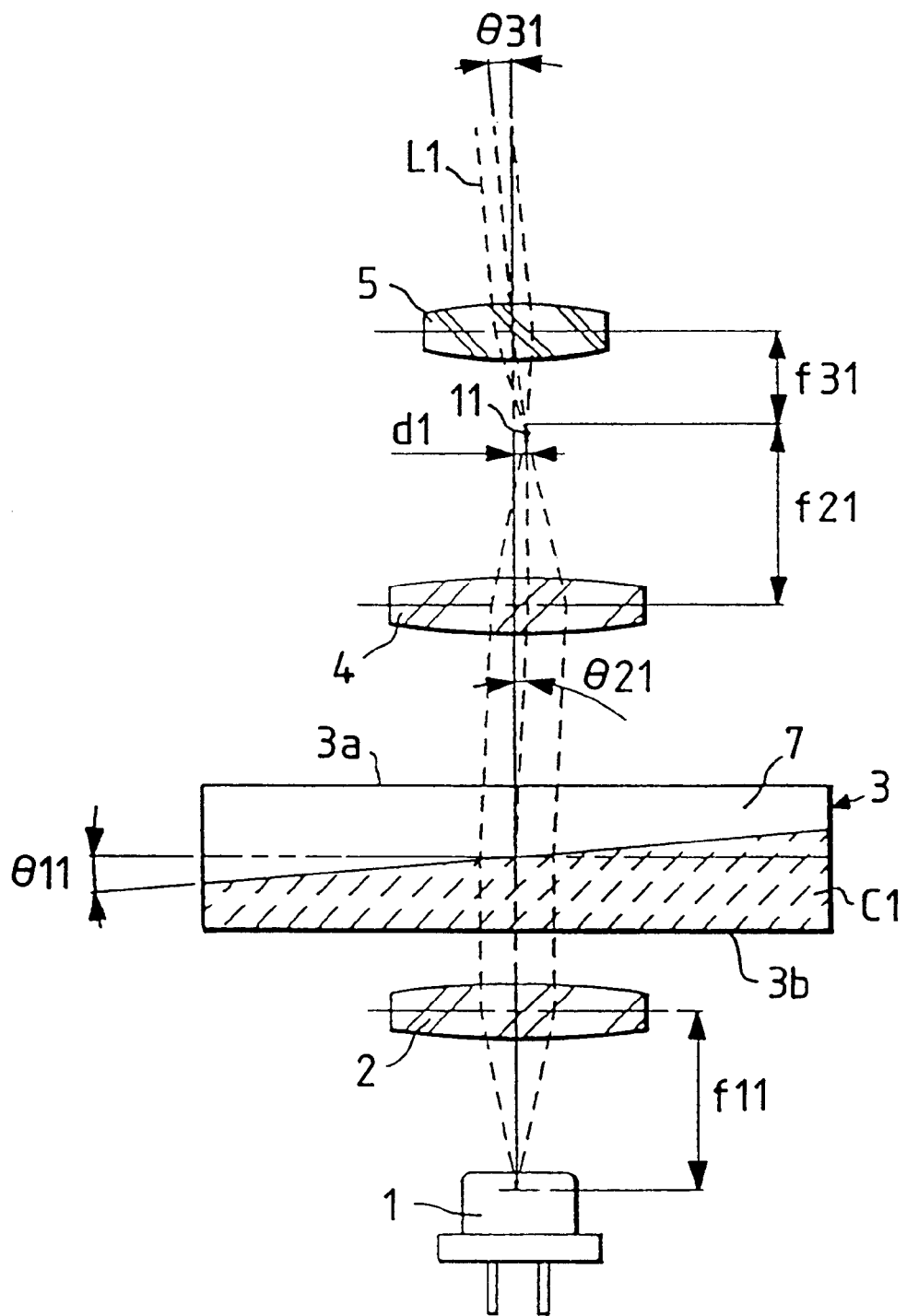
FIG. 1 is a view showing the overall arrangement of the automatic grade correction unit of a laser beam projection apparatus according to the first embodiment.

FIG. 1 is a view showing the overall arrangement of the automatic grade correction unit of a laser beam projection apparatus according to the first embodiment of the present invention.

The automatic grade correction unit comprises a first collimator lens (first optical member) 2 for collimating a laser beam L1 emitted from a laser diode 1 in the upper direction into a first parallel beam, a transparent vessel 3 through which the parallel beam from the first collimator lens 2 is transmitted, a projection lens (condensing optical member) 4 such as a convex lens or a concave lens for condensing the light beam transmitted through the transparent vessel 3 to form a secondary source 11 of the laser diode 1 at a position corresponding to a focal length f21, and a second collimator lens (second optical member) 5 for collimating the light beam from the secondary source 11 into a second parallel beam. The first collimator lens 2 and the like constituting the automatic grade correction unit are fixed in the main body of the laser beam projection apparatus such as a laser leveling apparatus.

The laser diode 1 is arranged at a position corresponding to a focal length f11 of the first collimator lens 2.

Silicone oil C1 having a refractive index of 1.51 is sealed in the transparent vessel 3. A space 7 is formed at the upper portion of the transparent vessel 3 in contact with the liquid surface of the silicone oil C1. Note that the silicone oil C1 need not always be sealed in the transparent vessel 3. An upper surface 3a and a lower surface 3b of the transparent vessel 3 are parallel to each other.

The position corresponding to a focal length f31 of the second collimator lens 5 coincides with the position of the secondary source 11.

The operation principle of the automatic grade correction unit will be described below.

The laser beam L1 from the laser diode 1 is collimated by the first collimator lens 2 into a parallel beam and becomes incident on the silicone oil C1 in the transparent vessel 3. When the main body of the laser beam projection apparatus is tilted at an angle θ11, the transparent vessel 3 is also tilted. Since the liquid surface of the silicone oil C1 in the transparent vessel 3 remains horizontal, the silicone oil C1 forms a sphenoidal shape having a gradient pitch 11. A laser beam L transmitted through the silicone oil C1 is tilted at an angle θ21:

$$\theta 21 = \mathrm{Sin}^{-1}(n1 \cdot \mathrm{Sin}\ \theta 11) - \theta 11 \qquad \text{Equation (1)}$$

and enters on the projection lens 4 (n1 is the refractive index of the silicone oil C1).

The laser beam L1 transmitted through the silicone oil C1 is condensed by the projection lens 4, and the secondary source 11 of the laser diode 1 is formed at a position corresponding to the focal length f21 of the projection lens 4.

The secondary source 11 is formed at a position separated from the vertical axis in the horizontal direction by a distance d1:

$$d1 = f21 \cdot \mathrm{Tan}\ \theta 21 \qquad \text{Equation (2)}$$

The laser beam L1 emerging from the projection lens 4 is incident on the second collimator lens 5 and collimated into a parallel beam having an angle θ31:

$$\theta 31 = \mathrm{Tan}^{-1}(d1/f31) \qquad \text{Equation (3)}$$

and is output in the vertical direction.

Substituting Equations (1) and (2) into Equation (3) yields:

$$\theta 31 = \mathrm{Tan}^{-1}\{f21 \cdot \mathrm{Tan}[\mathrm{Sin}^{-1}(n1 \cdot \mathrm{Sin}\ \theta 11) - \theta 11]/f31\} \qquad \text{Equation (4)}$$

so that the correction angle is obtained.

Let θ11=θ31=θ from Equation (4). Then, a correction condition formula is obtained as follows:

$$f31/f21 = \mathrm{Tan}[\mathrm{Sin}^{-1}(n1 \cdot \mathrm{Sin}\ \theta) - \theta]/\mathrm{Tan}\ \theta \qquad \text{Equation (5)}$$

(θ is an arbitrary correction angle). When the refractive index of the silicone oil C1 is determined, the focal lengths f21 and f31 of the projection lens 4 and the second collimator lens 5 can be set.

Figure 2:
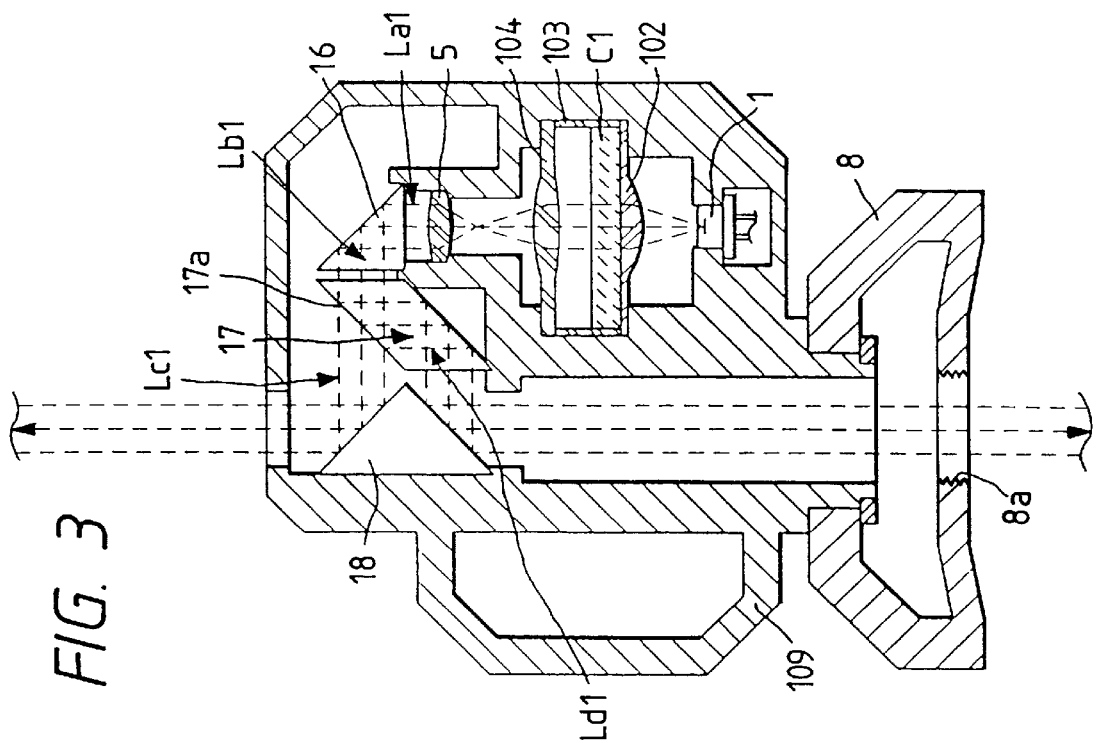
FIG. 2 is a longitudinal sectional view showing an application in which the automatic grade correction unit in FIG. 1 is applied to a laser leveling apparatus.

Since the automatic grade correction unit shown in FIG. 2 is constituted to satisfy Equation (4), the laser beam L1 is always output in the vertical direction.

For example, when θ=b 1°, n1=1.51, and f21=20 mm, f31=10.2 mm is obtained from Equation (5). Calculating the correction angle θ31 from Equation (4), θ31=10'0" when θ11=10', θ31=30'0.05" when θ11=30', and θ31=1°0'0.4" when θ11=1°. In this manner, correction can be properly performed.

As an application of this automatic grade correction unit, a laser transit which outputs a laser beam L1 in the upper vertical direction is available.

According to the automatic grade correction unit of the first embodiment, since the grade correction range is wide, no leveling unit for leveling the apparatus main body is needed to result in an increase in operation efficiency, and at the same time, a high grade correction accuracy can be obtained. In addition, a liquid having an optimum viscosity can be used independently of the refractive index, so that the degree of freedom of liquid selection increases.

FIG. 2 is a longitudinal sectional view showing an application in which the automatic grade correction unit in FIG. 1 is applied to a laser leveling apparatus. The same reference numerals as in the embodiment shown in FIG. 1 denote the same parts in FIG. 2, and a detailed description thereof will be omitted.

This laser leveling apparatus is constituted by a base plate 8, and an apparatus main body 9 attached to the base plate 8. A screw hole 8a in which a tripod (not shown) is to be attached is formed in the bottom surface portion of the base plate 8. The automatic grade correction unit in FIG. 1 is incorporated in the apparatus main body 9. More specifically, the laser diode 1 is fixed at the lower portion in the apparatus main body 9, and the first collimator lens 2, the transparent vessel 3, the projection lens 4, and the second collimator lens 5 are fixed above the laser diode 1. In addition, the focal length f21 of the projection lens 4 and the focal length f31 of the second collimator lens 5 are set to satisfy the above-described correction condition formula.

A cylindrical rotator 10 is arranged above the second collimator lens 5. The rotator 10 is rotatably attached to the upper portion in the apparatus main body 9 though a bearing 15. Pentagonal mirrors 12 for reflecting the laser beam L1 from the second collimator lens 5 at right angles are fixed in the rotator 10. The rotator 10 can be rotated by a motor 14 through a transmission belt 13.

According to the laser leveling apparatus of this application, even when the entire laser leveling apparatus is tilted, the laser beam L1 emerges from the second collimator lens 5 in the vertical direction, so that the laser beam L1 is reflected by the pentagonal mirrors 12 and becomes a horizontal beam. In addition, since the rotator 10 for holding the pentagonal mirrors 12 is rotated by the motor 14, the laser beam L1 reflected by the pentagonal mirrors 12 is output to the outside through a window 9a and is scanned in the 360° direction in the horizontal plane.

Figure 3:
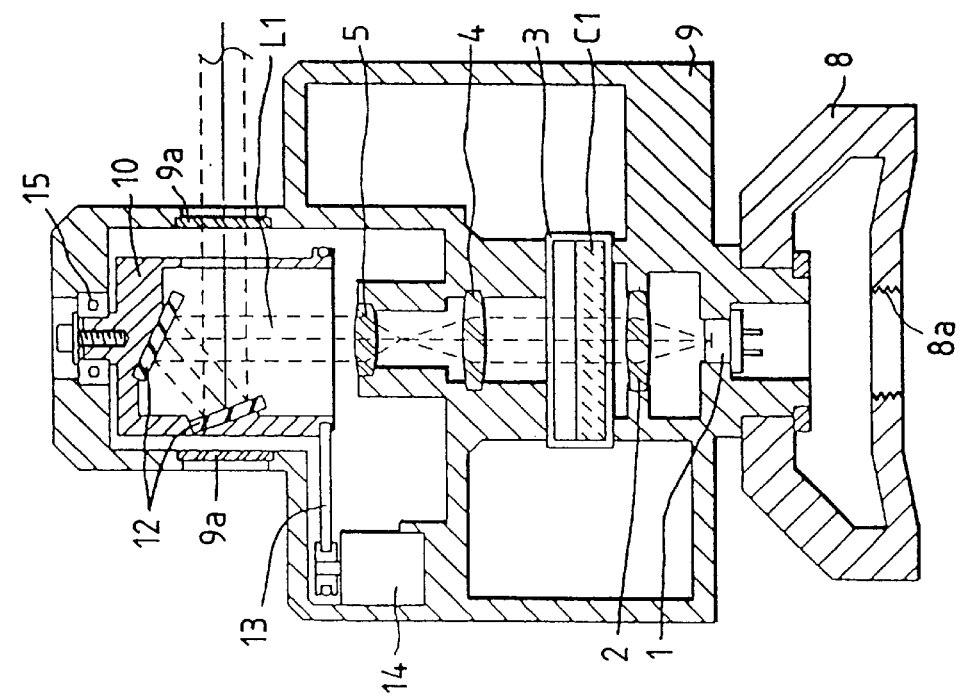
FIG. 3 is a longitudinal sectional view showing an application in which the automatic grade correction unit in FIG. 1 is applied to a laser transit.

FIG. 3 is a longitudinal sectional view showing another application in which the automatic grade correction unit in FIG. 1 is applied to a laser transit. The same reference numerals as in the embodiments shown in FIG. 1 and FIG. 2 denote the same parts in FIG. 3, and a detailed description thereof will omitted.

As in the laser leveling apparatus in FIG. 2, the automatic grade correction unit is incorporated in an apparatus main body 109. However, in this application, the lower surface portion (the end portion on which a light beam is incident) of a transparent vessel 103 is formed of a first collimator lens 102, and the upper surface portion (the end portion from which the light beam exits) of the transparent vessel 103 is formed of a projection lens 104.

As in the above embodiment, the focal length f21 of the projection lens 104 and the focal length f31 of the second collimator lens 5 are set to satisfy the above correction condition formula.

A rectangular prism 16 is arranged above the second collimator lens 5. A parallel prism 17 having a half-mirror surface 17a is arranged on the left side of the rectangular prism 16. A rectangular mirror 18 is arranged on the left side of the parallel prism 17.

A laser beam La1 emerging from the second collimator lens 5 in the vertical direction is reflected by the rectangular prism 16 to become a horizontal beam Lb1 and is split by the half-mirror surface 17a of the parallel prism 17 into a rectilinear beam Lc1 and a rectangular beam Ld1 deflected in the lower direction. The rectilinear beam Lc1 is output in the upper vertical direction via the rectangular mirror 18, so a visible laser beam is projected on a ceiling or the like. The optical path of the rectangular beam Ld1 is further deflected at right angles in the parallel prism 17, so that the rectangular beam Ld1 is output in the lower vertical direction via the rectangular mirror 18, and a visible laser beam is projected on a floor or the like.

According to this application, the lower surface portion of the transparent vessel 103 is formed of the first collimator lens 102, and the upper surface portion of the transparent vessel 103 is formed of the projection lens 104. For this reason, the number of components of the automatic grade correction unit decreases to reduce the size of the laser transit.

Figure 4:
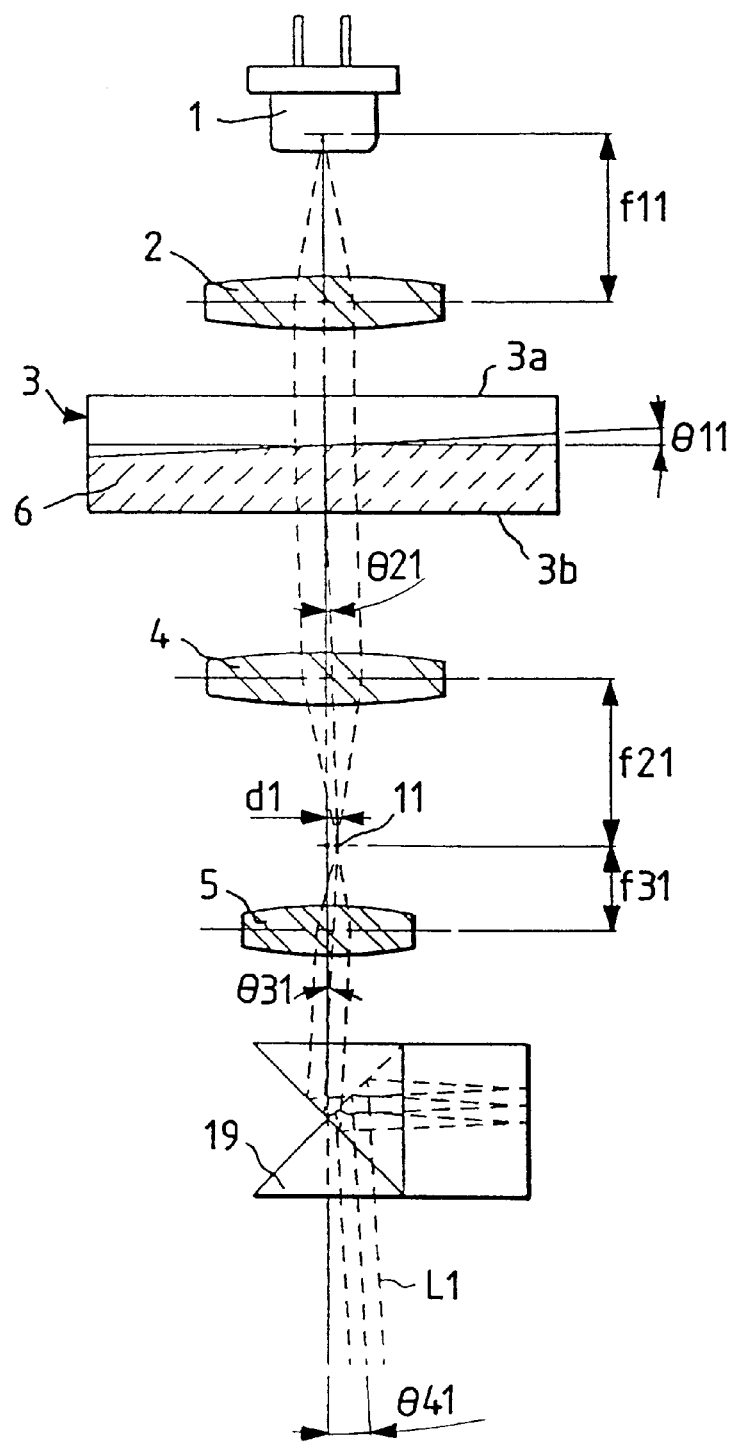
FIG. 4 is a view showing the overall arrangement of the automatic grade correction unit of a laser beam projection apparatus according to the second embodiment.

FIG. 4 is a view showing the overall arrangement of the automatic grade correction unit of a laser beam projection apparatus according to the second embodiment of the present invention. The same reference numerals as in the first embodiment shown in FIG. 1 denote the same parts in FIG. 4, and a detailed description thereof will be omitted. In the first embodiment, grade correction performed when the laser beam L1 is emitted from the laser diode 1 in the upper direction has been described. In this embodiment, grade correction performed when a laser beam L1 is emitted from a laser diode 1 in the lower direction will be described.

This arrangement is different from the first embodiment shown in FIG. 1 only in that the arrangement of a first collimator lens 2, a transparent vessel 3, a projection lens 4, and a second collimator lens 5 is inverted, and a Porro prism 19 is arranged under the second collimator lens 5.

The reason why the Porro prism 19 is arranged under the second collimator lens 5 is as follows. When the apparatus main body in which the laser diode 1 and the like are fixed is tilted, the laser beam L1 coming from the second collimator lens 5 is deflected in the same direction as the tilt direction of the apparatus main body, i.e., in a direction opposite to the correction direction, at a two-fold angle, contrary to the first embodiment. Therefore, the laser beam L1 is inverted/reflected to obtain a correction angle θ41 and always output the laser beam L1 in the lower vertical direction.

As an application of this automatic grade correction unit, a laser transit which outputs the laser beam L1 in the lower vertical direction is available.

According to the automatic grade correction unit of the second embodiment, the same effect as of the first embodiment can be obtained.

FIG. 5 is a longitudinal sectional view showing an application in which the automatic grade correction unit in FIG. 4.is applied to a laser leveling apparatus. The same reference numerals as in the laser leveling apparatus in FIG. 2 denote the same parts in FIG. 5, and a detailed description thereof will be omitted. In this application, the laser diode 1 is fixed at the upper portion in an apparatus main body 209. The first collimator lens 2, the transparent vessel 3, the projection lens 4, and the second collimator lens 5 are sequentially fixed under the laser diode 1, so that the positional relationship is reversed to that in the laser leveling apparatus in FIG. 2.

The Porro prism 19 is arranged under the second collimator lens 5. A rotator 10 having pentagonal mirrors 12 is arranged under the Porro prism 19.

According to the laser leveling apparatus of this embodiment, even when the apparatus main body 209 is tilted, and the laser beam L1 emerges from the second collimator lens 5 while being tilted in a direction opposite to the correction direction, the laser beam L1 is inverted/reflected by the Porro prism 19, and the laser beam L1 is always output in the lower vertical direction. The laser beam L1 is reflected by the pentagonal mirrors 12 to become a horizontal beam, and the rotator 10 for holding the pentagonal mirrors 12 is rotated by a motor 14. For this reason, the laser beam L1 reflected by the pentagonal mirrors 12 is output to the outside through a window 209a and is scanned in the 360° direction in a horizontal plane.

FIG. 6 is a longitudinal sectional view showing another application in which the automatic grade correction unit in FIG. 4 is applied to a laser leveling apparatus. The same reference numerals as in the laser leveling apparatus in FIG. 2 denote the same parts in FIG. 6, and a detailed description thereof will be omitted. In this application, in place of the Porro prism 19, a conical mirror 20 is arranged at the lower portion in an apparatus main body 309.

According to the laser leveling apparatus of this embodiment, even when the apparatus main body 309 is tilted, and the laser beam L1 emerges from the second collimator lens 5 while being tilted in a direction opposite to the correction direction, the laser beam is corrected to direct the horizontal direction by the mirror function of the conical mirror 20. For this reason, the laser beam L1 is output to the outside through a window 309a and is scanned in the 360° direction in a horizontal plane.

In the laser transit in FIG. 3, the lower surface portion of the transparent vessel 3 is formed of the first collimator lens 102, and the upper portion is formed of the projection lens 104. However, in each of the embodiments other than the embodiment in FIG. 3 as well, one of the upper and the lower surface portions of the transparent vessel 3 may be formed of the first collimator lens 2, and the other may be formed of the projection lens 4.

A single or a plurality of transparent vessels 3 may be arranged. In addition, the laser beam L1 may be scanned in the 360° direction in the vertical plane, or may be scanned in the 360° direction in a plane tilted with respect to the horizontal plane.

Figure 7:
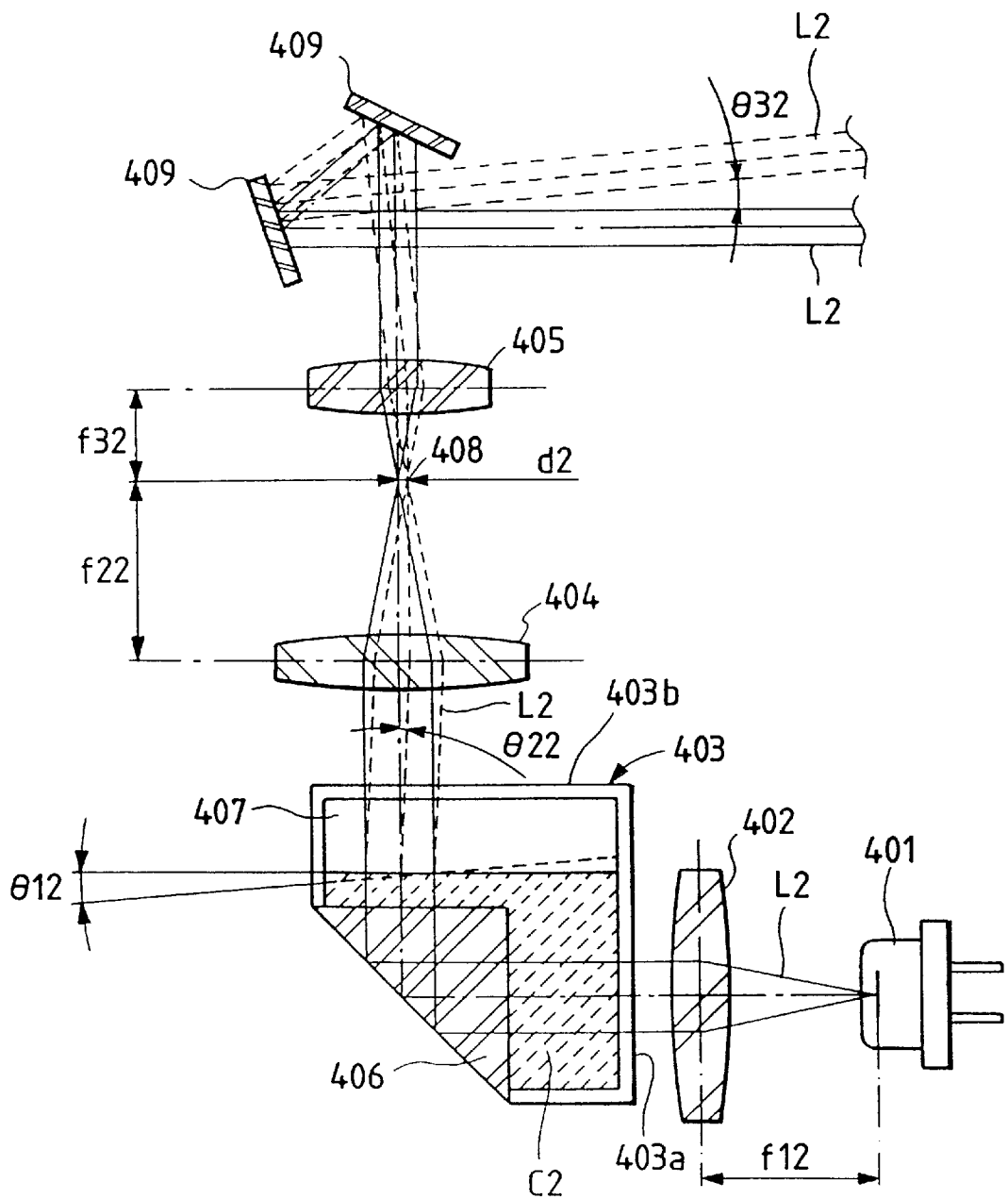
FIG. 7 is a view showing the main part of a laser beam projection apparatus according to the third embodiment.

FIG. 7 is a view showing the main part of a laser beam projection apparatus according to the third embodiment of the present invention.

The laser beam projection apparatus of the third embodiment comprises a collimator lens 402 for collimating a laser beam L2 emitted from a laser diode (light source) 401 into a parallel beam, a transparent vessel 403 in which silicone oil (transparent liquid) C2 having a free liquid surface is sealed, a rectangular prism 406 formed in the transparent vessel 403 to deflect the parallel beam incident on the transparent vessel 403 at right angles, a projection lens (condenser lens) 404 for condensing the laser beam L2 from the rectangular prism 406 to form a secondary source 408 of the laser diode 401 at a position corresponding to a focal length f22, a third collimator lens 405 for collimating the laser beam L2 from the projection lens 404 into a parallel beam, and a pentagonal mirror 409 for reflecting the laser beam L2 from the third collimator lens 405 at right angles.

The laser diode 401, the collimator lenses 402 and 405, the projection lens 404, the transparent vessel 403, and the like are fixed in the apparatus main body (not shown) of the laser beam projection apparatus. The pentagonal mirror 409 is pivotally attached to the apparatus main body, and the pentagonal mirror 409 is rotated by a driving unit such as a motor.

The laser diode 401 is arranged at a position corresponding to a focal length fl2 of the collimator lens 402.

The rectangular prism 406 is fixed in the transparent vessel 403. The silicone oil C2 having a refractive index of 1.51 is sealed in the transparent vessel 403. A space 407 is formed in the transparent vessel 403 in contact with the liquid surface of the silicone oil C2. An incident surface 403a and an exit surface 403b of the transparent vessel 403 are adjacent to each other at right angles.

The position corresponding to a focal length f32 of the third collimator lens 405 coincides with the position of the secondary source 408.

The members except the pentagonal mirror 409, i.e., the collimator lens 402, the transparent vessel 403, the rectangular prism 406, the projection lens 404, and the third collimator lens 405 constitute an automatic grade correction unit.

The operation of the automatic grade correction unit in horizontal plane laser projection will be described below with reference to FIG. 7.

The laser beam L2 from the laser diode 401 is collimated by the collimator lens (first optical member) 402 into a parallel beam, incident from the incident surface 403a on the transparent vessel 403, and reflected by the rectangular prism (optical path deflecting member) 406 at right angles. When the apparatus main body of the laser beam projection apparatus is tilted at an angle θ12, the transparent vessel 403 is tilted accordingly. Since the liquid surface of the silicone oil C2 in the transparent vessel 403 remains horizontal, the silicone oil C2 forms a sphenoidal shape having a gradient pitch θ12. The laser beam L2 transmitted through the liquid surface of the silicone oil C2 is tilted at an angle θ22:

$$\theta 22 = \mathrm{Sin}^{-1}(n2 \cdot \mathrm{Sin}\ \theta 12) - \theta 12 \qquad \text{Equation (11)}$$

and incident on the projection lens 404 (n2 is the refractive index of the silicone oil C2).

The laser beam L2 transmitted through the silicone oil C2 is condensed by the projection lens (condensing optical member) 404, thereby forming the secondary source 408 of the laser diode 401 at a position corresponding to the focal length f22 of the projection lens 404. The secondary source 408 is formed at a position separated from the vertical axis in the vertical direction by a distance d2:

$$d2 = f22 \cdot \mathrm{Tan}\ \theta 22 \qquad \text{Equation (12)}$$

The laser beam L2 from the projection lens 404 is incident on the third collimator lens (second optical member) 405, becomes a second parallel beam having an angle θ32:

$$\theta 32 = \mathrm{Tan}^{-1}(d2/f32) \qquad \text{Equation (13)}$$

and is output in the vertical direction.

Substituting Equations (11) and (12) in Equation (13) yields:

$$\theta 32 = \mathrm{Tan}^{-1}\{f22 \cdot \mathrm{Tan}[\mathrm{Sin}^{-1}(n2 \cdot \mathrm{Sin}\ \theta 12) - \theta 12]/f32\} \qquad \text{Equation (14)}$$

so that the correction angle is obtained.

Let θ12=θ32=θ from Equation (14). Then, the correction condition formula is obtained as follows:

$$f32/f22 = [\mathrm{Sin}^{-1}(n2 \cdot \mathrm{Sin}\ \theta) - \theta]/\theta \qquad \text{Equation (15)}$$

(θ is an arbitrary correction angle). When the refractive index of the silicone oil C2 is determined, the focal lengths f22 and f32 of the projection lens 404 and the third collimator lens 405 can be set.

Since the automatic grade correction unit shown in FIG. 7 is constituted to satisfy Equation (15), the laser beam L2 is always output in the vertical direction.

For example, when θ=1°, n2=1.51, and f22=20 mm, f32=10.2 mm is obtained from Equation (15). Calculating the correction angle θ32 from Equation (14), θ32=10'0" when θ12=10', θ32=30'0.05" when θ12=30', and θ32= 1°0'0.4" when θ12=1°. In this manner, correction can be properly performed.

The laser beam L2 emerging in the vertical direction is reflected by the pentagonal mirror (reflecting optical member) 409 at right angles, and rotated/projected in the 360° direction as the laser beam L2 forming a horizontal plane.

The operation of the automatic grade correction mechanism in vertical plane laser projection will be described below with reference to FIG. 8.

Figure 8:
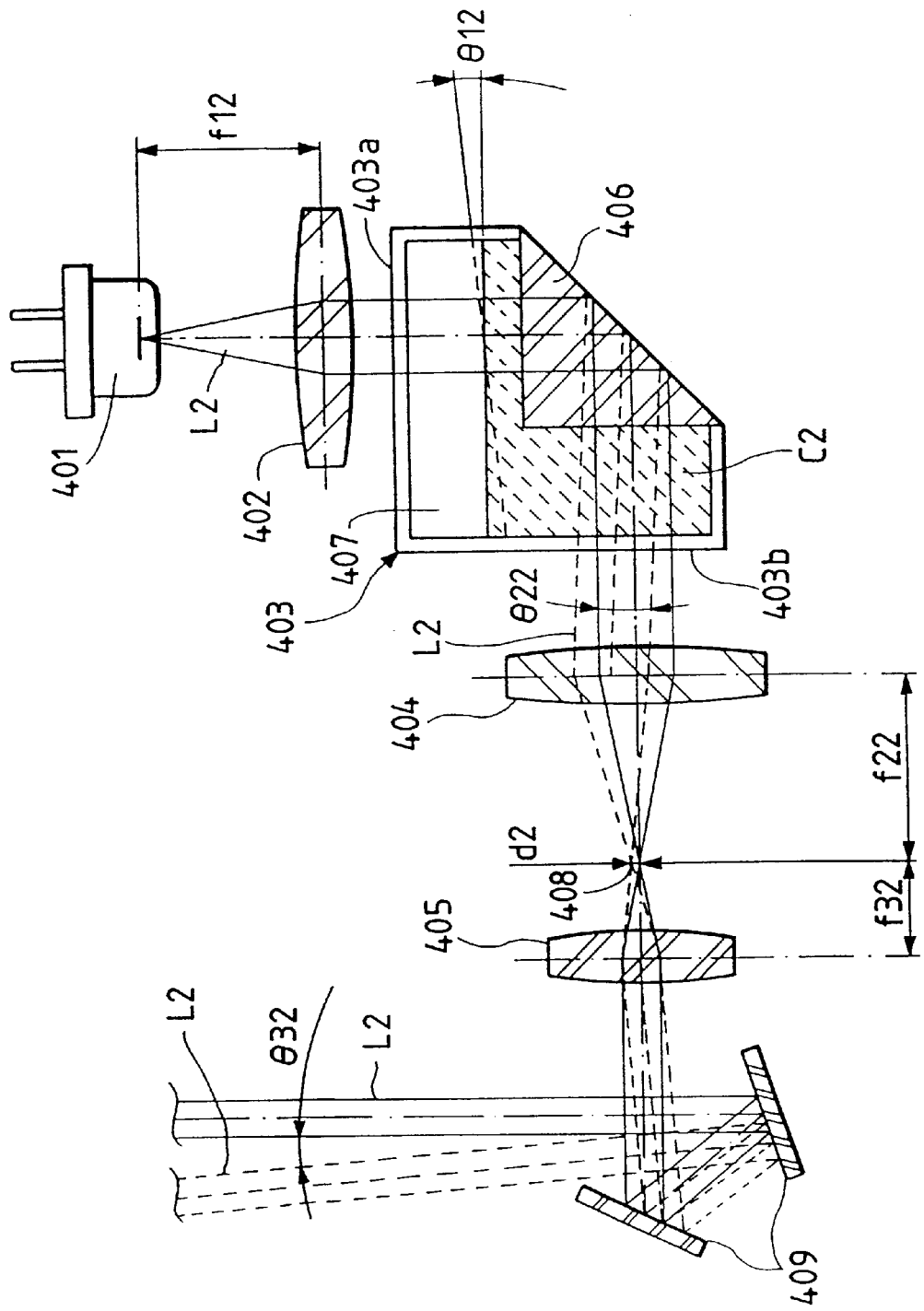
FIG. 8 is a view showing a state wherein the laser beam projection apparatus in FIG. 7 is rotated through 90°.

In vertical plane laser projection, the laser beam projection apparatus in FIG. 7 is rotated through 90° and set in the state of FIG. 8. The laser beam L2 from the laser diode 401 is collimated by the collimator lens 402 into a parallel beam and incident from the incident surface 403a on the transparent vessel 403. When the laser beam projection apparatus is rotated through 90° as described above, the silicone oil C2 flows, so that the laser beam L2 is incident on the liquid surface of the silicone oil C2.

When the apparatus main body of the laser beam projection apparatus is tilted at an angle θ12, the transparent vessel 403 is tilted accordingly. Since the liquid surface of the silicone oil C2 in the transparent vessel 403 remains horizontal, the silicone oil C2 forms a sphenoidal shape having a gradient pitch θ12. The laser beam L2 transmitted through the liquid surface of the silicone oil C2 and reflected by the rectangular prism 406 at right angles is tilted at the angle θ22 represented by Equation (11).

The laser beam L2 reflected by the rectangular prism 406 at right angles emerges from the exit surface 403b. The laser beam L2 emerging from the exit surface 403b is condensed by the projection lens 404, thereby forming the secondary source 408 of the laser diode 401 at a position corresponding to the focal length f22 of the projection lens 404. The secondary source 408 is formed at a position separated from the vertical axis in the vertical direction by the distance d2 represented by Equation (12).

The laser beam L2 from the projection lens 404 is incident on the third collimator lens 405 to become a parallel beam having the angle θ32 represented by Equation (13) and emerges in the horizontal direction.

The laser beam L2 emerging in the horizontal direction is reflected by the pentagonal mirror 409 at right angles and rotated/projected in the 360° direction as the laser beam L2 forming a vertical plane.

According to the laser beam projection apparatus of the third embodiment, the laser beam L2 can be rotated/projected to form both a vertical plane and a horizontal plane only by changing the posture of the laser beam projection apparatus. For this reason, setting operation can be performed both in the vertical plane and in the horizontal plane by a single apparatus, so no dedicated apparatus for each plane need be prepared. Therefore, the workability is improved, and at the same time, the operation cost can be decreased.

Since the grade correction function works both in vertical plane projection and in horizontal plane projection, a high grade correction accuracy can be obtained. Since a high accuracy can be obtained with the single transparent vessel 403 containing the silicone oil C2 and a simple optical system, the manufacturing cost can be decreased.

Figure 9:
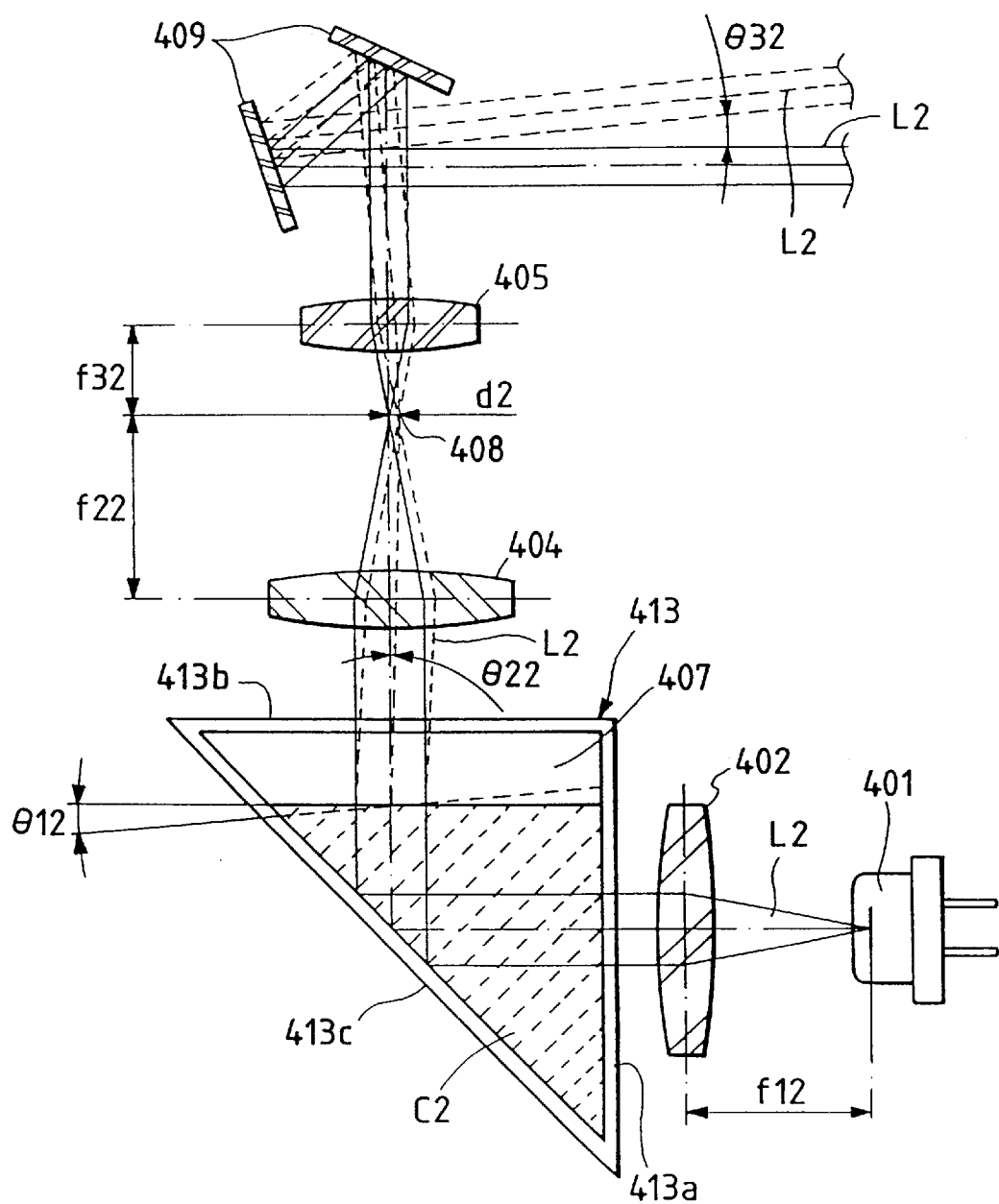
FIG. 9 is a view showing the main part of a laser beam projection apparatus according to the fourth embodiment.
Figure 10:
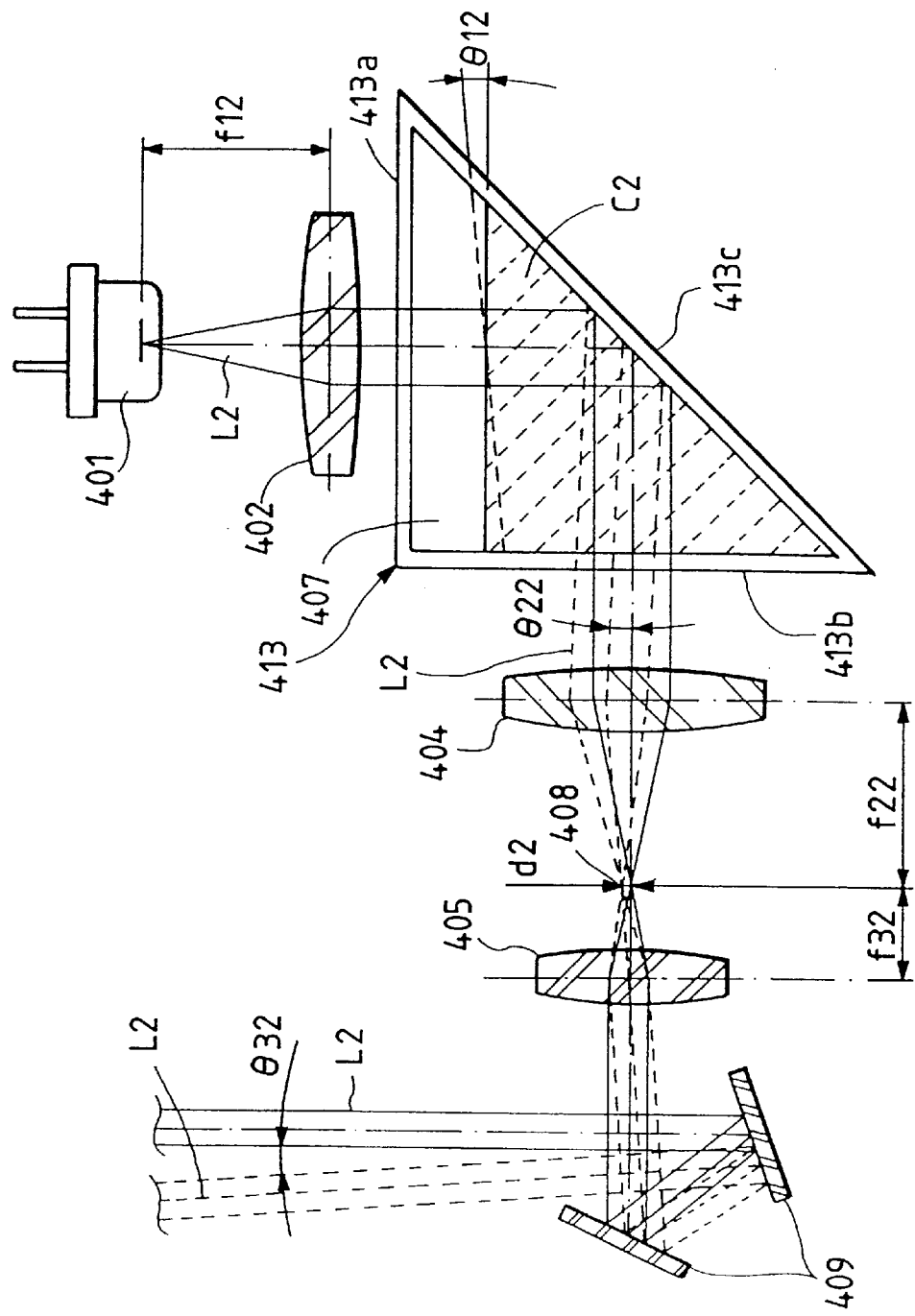
FIG. 10 is a view showing a state wherein the laser beam projection apparatus in FIG. 9 is rotated through 90°.

FIG. 9 is a view showing the main part of a laser beam projection apparatus according to the fourth embodiment of the present invention. FIG. 10 is a view showing a state wherein the laser beam projection apparatus in FIG. 9 is rotated through 90°. The same reference numerals as in the embodiment shown in FIG. 7 denote the same parts in FIGS. 9 and 10, and a detailed description thereof will be omitted.

In the third embodiment, as an optical path deflecting member, the rectangular prism 406 for deflecting the laser beam L2 from the laser diode 401 at right angles is accommodated in the transparent vessel 403. In the fourth embodiment, the rectangular prism 406 is not used, and instead, only a transparent vessel 413 having a rectangular-equilateral-triangular section is used, as shown in FIG. 9. As in the third embodiment, silicone oil C2 is sealed in the transparent vessel 413, and a space 407 is formed in the transparent vessel 413 in contact with the liquid surface of the silicone oil C2. The transparent vessel 413 has an incident surface 413a, an exit surface 413b, and an oblique surface 413c.

The oblique surface 413c serving as an optical path deflecting member has a critical angle of 45°. Therefore, a laser beam L2 incident from a collimator lens 402 through the incident surface 413a is totally reflected by the oblique surface 413c and emerges from the exit surface 413b.

The operation of the automatic grade correction mechanism in horizontal plane projection and in vertical plane projection is the same as in the third embodiment. As in the third embodiment, in horizontal plane projection, the laser beam projection apparatus is set in the state of FIG. 9, and in vertical plane projection, the laser beam projection apparatus in FIG. 9 is tilted at 90° and set in the state of FIG. 10. A detailed description of the operation will be omitted.

According to the laser beam projection apparatus of the fourth embodiment, the same effect as in the third embodiment can be obtained. At the same time, since the rectangular prism 406 serving as an optical path deflecting member is not used, the cost can be decreased.

Figure 11:
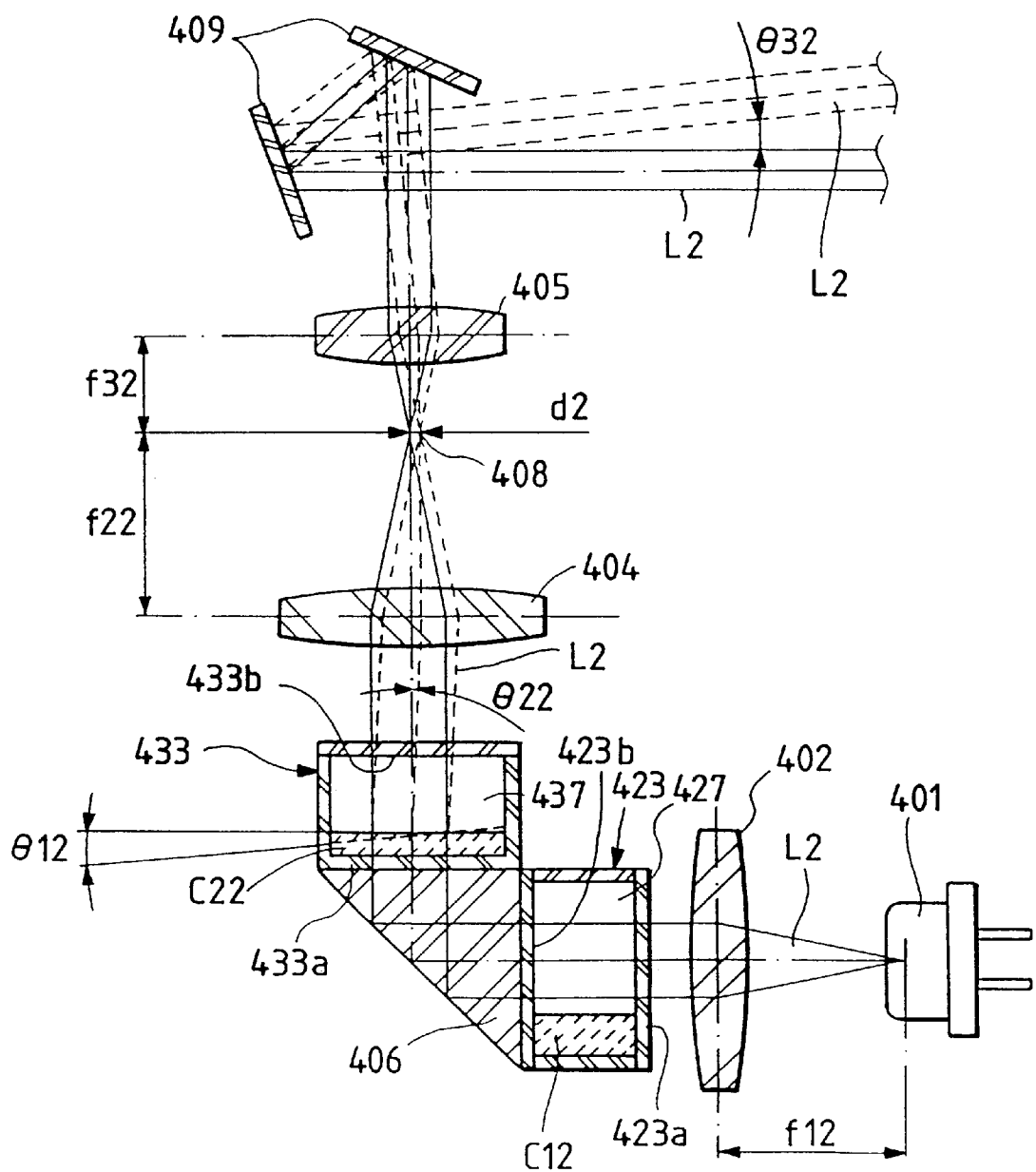
FIG. 11 is a view showing the main part of a laser beam projection apparatus according to the fifth embodiment.
Figure 12:
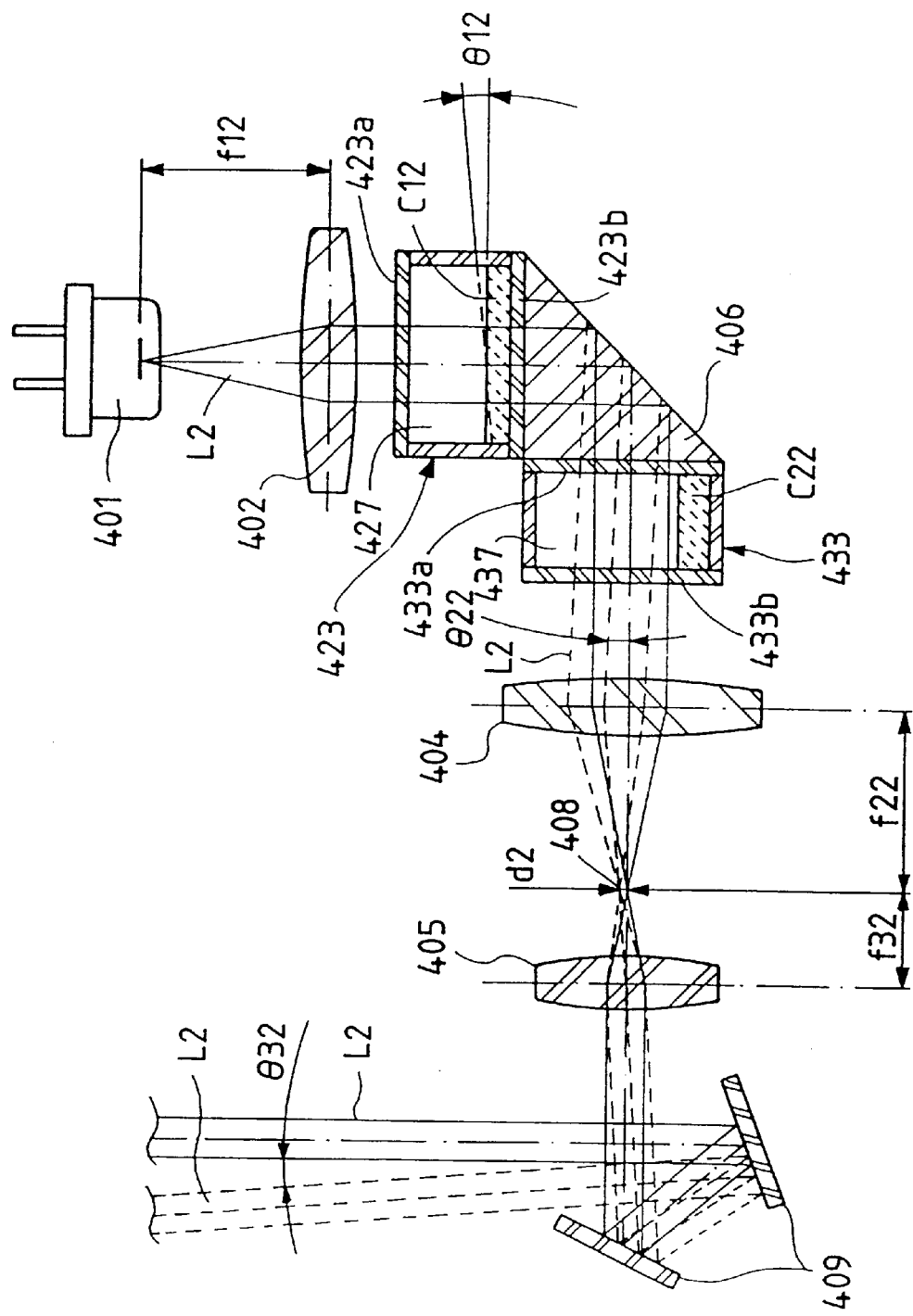
FIG. 12 is a view showing a state wherein the laser beam projection apparatus in FIG. 11 is rotated through 90°.

FIG. 11 is a view showing the main part of a laser beam projection apparatus according to the fifth embodiment of the present invention. FIG. 12 is a view showing a state wherein the laser beam projection apparatus in FIG. 11 is rotated through 90°. The same reference numerals as in the embodiment shown in FIG. 7 denote the same parts in FIGS. 11 and 12, and a detailed description thereof will be omitted.

In the third embodiment, the rectangular prism 406 serving as an optical path deflecting member is accommodated in the transparent vessel 403. In the fifth embodiment, a transparent vessel (first vessel) 423 having a rectangular section is arranged on the incident side of a rectangular prism 406 serving as an optical path deflecting member, and a transparent vessel (second vessel) 433 is arranged on the exit side of the rectangular prism 406. Silicone oils C12 and C22 are sealed in the transparent vessels 423 and 433, respectively. Spaces 427 and 437 are formed in the transparent vessels 423 and 433, respectively, in contact with the free liquid surfaces of the silicone oils C12 and C22.

The operation of the automatic grade correction mechanism in horizontal plane laser beam projection will be described below with reference to FIG. 11.

A laser beam L2 from a laser diode 401 is collimated by a collimator lens 402 into a parallel beam, incident from an incident surface 423a of the transparent vessel 423, and emerges from an exit surface 423b via the space 427. The laser beam L2 leaving the exit surface 423b is reflected by the rectangular prism 406 at right angles, incident from an incident surface 433a of the transparent vessel 433, transmitted through the free liquid surface of the silicone oil C22, and emerges from an exit surface 433b. The laser beam L2 transmitted through the free liquid surface of the silicone oil C22 is condensed by a projection lens 404, thereby forming a secondary source 408 of the laser diode 401 at a position corresponding to a focal length f22 of the projection lens 404. The secondary source 408 is formed at a position separated from the vertical axis in the horizontal direction by a distance d2 represented by Equation (12).

The laser beam L2 from the projection lens 404 is incident on a third collimator lens 405 to become a parallel beam having an angle θ32 represented by Equation (13) and emerges in the vertical direction.

The laser beam L2 output in the vertical direction is reflected by a pentagonal mirror 409 at right angles and rotated/projected in the 360° direction as the laser beam L2 forming a horizontal plane.

In vertical plane laser beam projection, the laser beam projection apparatus in the state of FIG. 11 is rotated through 90° and set in the state of FIG. 12. The laser beam L2 originating from the laser diode 401 is collimated by the collimator lens 402 and becomes incident from the incident surface 423a of the transparent vessel 423. As described above, when the laser beam projection apparatus is rotated through 90°, the silicone oils C12 and C22 flow. The laser beam L2 entering the incident surface 423a is incident on the liquid surface of the silicone oil C12. The laser beam L2 transmitted through the free liquid surface of the silicone oil C12 emerges from the exit surface 423b, is reflected by the rectangular prism 406 at right angles, incident from the incident surface 433a of the transparent vessel 433, and leaves the exit surface 433b through the space 437.

When the apparatus main body of the laser beam projection apparatus is tilted at an angle θ12, the transparent vessels 423 and 433 are tilted accordingly. Since the liquid surfaces of the silicone oils C12 and C22 in the transparent vessels 423 and 433 remain horizontal, the silicone oils C12 and C22 form sphenoidal shapes having gradient pitches θ12. The laser beam L2 transmitted through the liquid surface of the silicone oil C12 and reflected by the rectangular prism 406 at right angles is tilted at an angle θ22 represented by Equation (11).

The laser beam L2 reflected by the rectangular prism 406 at right angles emerges from the exit surface 433b. The laser beam L2 is condensed by the projection lens 404, thereby forming the secondary source 408 of the laser diode 401 at a position corresponding to the focal length f22 of the projection lens 404. The secondary source 408 is formed at a position separated from the horizontal axis in the vertical direction by the distance d2 represented by Equation (12).

The laser beam L2 from the projection lens 404 is incident on the third collimator lens 405 to become a parallel beam having an angle θ32 represented by Equation (13) and emerges in the horizontal direction.

The laser beam L2 output in the horizontal direction is reflected by the pentagonal mirror 409 at right angles and rotated/projection in the 360° direction as the laser beam L2 forming a vertical plane.

According to the laser beam projection apparatus of the fifth embodiment, the same effect as in the third embodiment can be obtained.

In each of the above-described embodiments, the pentagonal mirror 409 and a driving unit for rotating the pentagonal mirror 409 are used. Instead, a conical mirror may be used.

Figure 13:
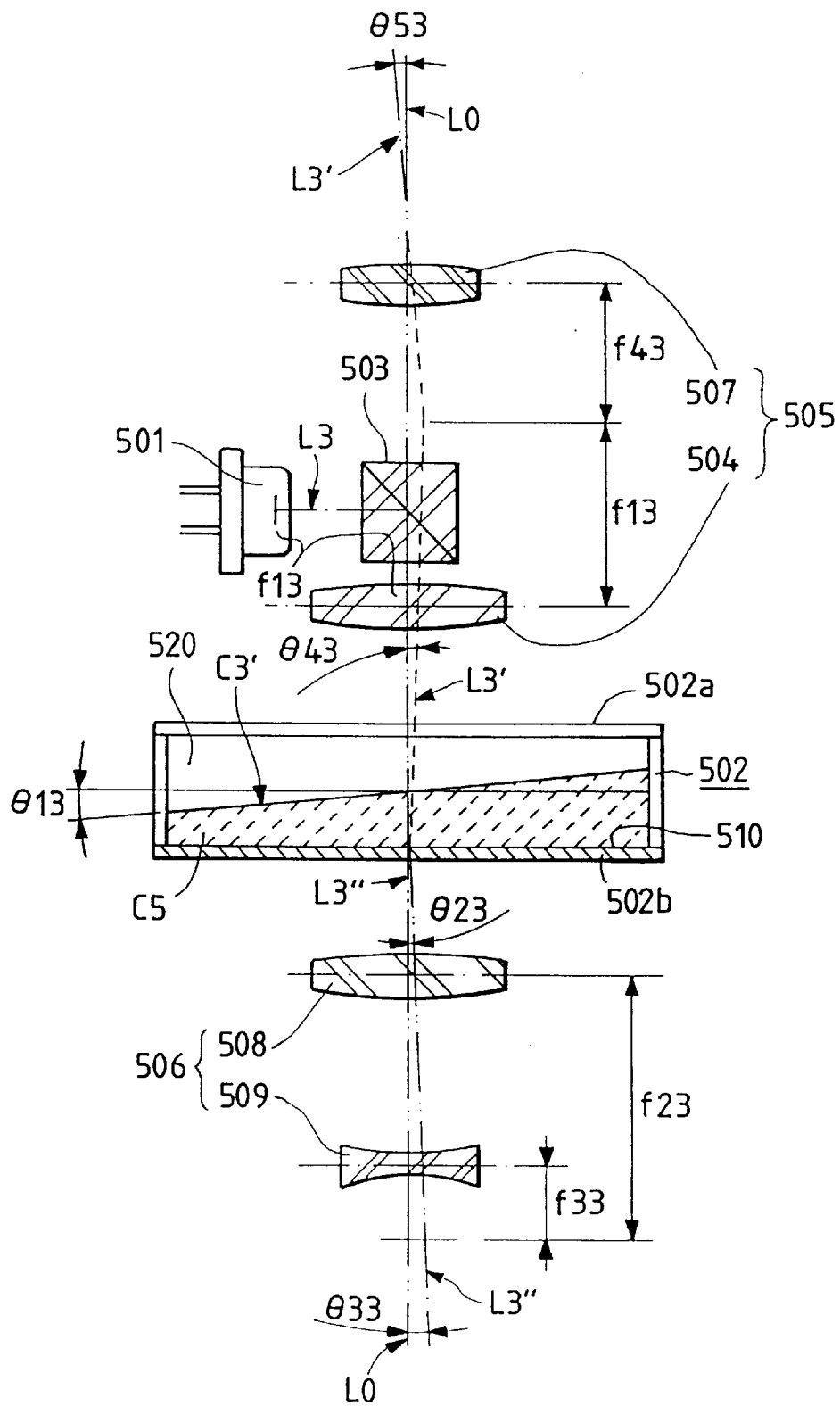
FIG. 13 is a view showing the overall arrangement of a laser beam projection apparatus according to the sixth embodiment.

FIG. 13 is a view showing the overall arrangement of the automatic grade correction unit of a survey apparatus according to the sixth embodiment of the present invention.

The automatic grade correction unit comprises a laser diode 501, a transparent vessel (to be simply referred to as a vessel hereinafter) 502 having an upper wall portion (upper surface) 502a and a lower wall portion (lower surface) 502b, which are parallel to each other, and a half prism 503 for reflecting a laser beam L3 emitted from the laser diode 501 at right angles downward toward the vessel 2. The automatic grade correction unit further comprises a Keplerian telescope (first enlargement optical system) 505 having a collimator lens 504 for collimating the laser beam L3 reflected by the half prism 503 into a parallel beam, and a Galilean telescope (second enlargement optical system) 506.

The laser diode 501 is arranged at a position corresponding to a focal length f13 of the collimator lens 504 through the half prism 503 and emits the laser beam L3 toward the half prism 503 in a direction perpendicular to an optical axis L0 of the collimator lens 504. An illumination optical system is constituted by the laser diode 501 and the half prism 503.

Silicon oil (transparent liquid) C3 having a refractive index n3 is sealed in the vessel 502. A space 520 is formed in the vessel 502 in contact with a free liquid surface C3' of the silicon oil C3.

A half mirror 510 for splitting the laser beam L3 incident from the upper wall portion 502a on the vessel 502 and transmitted through the silicon oil C3 into a light beam in the upper direction and a light beam in the lower direction is formed on the inner surface of the lower wall portion 502b of the vessel 502.

The Keplerian telescope 505 increases the tilt of a laser beam L3' reflected by the half mirror 510 and leaving the vessel 502 in the upper direction and is constituted by a convex lens commonly used as the collimator lens 504 and a convex lens 507. The collimator lens (convex lens) 504 and the convex lens 507 have a positional relationship so that the laser beam L3' emerging from the convex lens 507 becomes a parallel beam. The magnification (f13/f43) of the Keplerian telescope 505 is set in accordance with the refractive index n3 of the silicon oil C3 such that the laser beam L3' emerging from the convex lens 507 becomes a vertical beam in the upper direction. Note that f43 is the focal length of the convex lens 507.

The Galilean telescope 506 increases the tilt of a laser beam L3" transmitted through the half mirror 510 and emerging from the vessel 502 in the lower direction and is constituted by a convex lens 508 and a concave lens 509. The optical axis of the Galilean telescope 506 coincides with the optical axis L0 of the Keplerian telescope 505. The convex lens 508 and the concave lens 509 have a positional relationship so that the laser beam L3" emerging from the concave lens 509 becomes a parallel beam. The magnification (f23/f33) of the Galilean telescope 506 is set in accordance with the refractive index n3 of the silicon oil C3 such that the laser beam L3" emerging from the concave lens 509 becomes a vertical beam in the lower direction. Note that f23 is the focal length of the convex lens 508, and f33 is the focal length of the concave lens 509.

The half mirror 510 transmits about ½ the light amount of an incident light beam and reflects about ½ the light amount. The ratio of the transmission light amount to the reflection light amount can be arbitrarily set, as needed.

The operation of the automatic grade correction unit according to the sixth embodiment having the above arrangement will be described below.

The laser beam L3 from the laser diode 501 is reflected by the half prism 503, collimated by the collimator lens 504 into a parallel beam, and incident on the vessel 502.

When the entire survey apparatus is tilted at an angle θ13, the vessel 502 is tilted accordingly. Since the free liquid surface C3' of the silicon oil C3 remains horizontal, the silicone oil C3 forms a sphenoidal shape having a gradient pitch θ13 (a broken line portion in FIG. 13). For the illustrative convenience, FIG. 13 shows a state wherein the free liquid surface C3' is tilted at the angle θ13 with respect to the vessel 502.

The laser beam L3" incident from the upper wall portion 502a on the vessel 502 and transmitted through the free liquid surface C3' and the silicone oil C3 is refracted by the sphenoidal silicone oil C3 and split by the half mirror 510 into a light beam in the upper direction (reflection light) and a light beam in the lower direction (transmission light).

The laser beam (light beam in the lower direction) L3" transmitted through the half mirror 510 to almost halve the light amount is incident on the convex lens 508 of the Galilean telescope 506 while being tilted at an angle θ23 represented by the following Equation (21):

$$\theta 23 = (n3-1) \cdot \theta 13 \qquad \text{Equation (21)}$$

The tilt angle θ23 of the laser beam L3" is increased by the magnification according to the focal length f23 of the convex lens 508 and the focal length f33 of the concave lens 509, so that the laser beam becomes the laser beam L3" having an angle θ33 represented by Equation (22) below and leaves the concave lens 509 in the lower vertical direction:

$$\theta 33 = \theta 23 \cdot f23/f33 \qquad \text{Equation (22)}$$

That is, the angle θ33 subjected to automatic grade correction is obtained as follows by substituting Equation (21) into Equation (22):

$$\theta 33 = (n3-1) \cdot \theta 13 \cdot f23/f33 \qquad \text{Equation (23)}$$

As is apparent from Equation (23), the tilt angle θ13 of the entire survey apparatus must be equal to the angle θ33 after grade correction. Therefore, letting θ13=θ33, a grade correction condition formula represented by the following Equation (24) is obtained:

$$f23/f33 = 1/(n3-1) \qquad \text{Equation (24)}$$

On the other hand, the laser beam L3' (light beam in the upper direction) reflected by the half mirror 510 is transmitted through the silicone oil C3 and the free liquid surface C3' again and emerges from the upper wall portion 502a of the vessel 502. The laser beam L3' at this time is incident on the convex lens (collimator lens) 504 of the Keplerian telescope 505 while being tilted at an angle θ43 approximately given by the following Equation (25):

$$\theta 43 = (n3-1/n3) \cdot \theta 13 \qquad \text{Equation (25)}$$

The tilt angle θ43 of the laser beam L3' is increased by the magnification according to the focal length f13 of the collimator lens (convex lens) 504 and the focal length f43 of the convex lens 507, so that the laser beam becomes the laser beam L3' having an angle θ53 represented by Equation (26) below and emerges from the convex lens 507 in the upper vertical direction.

$$\theta 53 = \theta 43 \cdot f13/f43 \qquad \text{Equation (26)}$$

That is, the angle θ53 subjected to automatic grade correction is obtained as follows by substituting Equation (25) into Equation (26).

$$\theta 53 = (n3-1/n3) \cdot \theta 13 \cdot f13/f43 \qquad \text{Equation (27)}$$

As is apparent from Equation (27), the tilt angle θ13 of the entire survey apparatus must be equal to the angle θ53 after grade correction. Therefore, when θ13=θ53, a grade correction condition formula represented by the following Equation (28) is obtained:

$$f13/f43 = 1/(n3-1/n3) \qquad \text{Equation (28)}$$

According to the sixth embodiment, both the light beam in the lower vertical direction (laser beam L3") and the light beam in the upper vertical direction (laser beam L3') can simultaneously be output after the tilt angle θ13 of the entire survey apparatus is corrected. Therefore, this apparatus can be used for an ink projection operation (an operation for transferring ink, i.e., a point on the floor to the ceiling) performed in an interior finish work or the like of a building.

Figure 16:
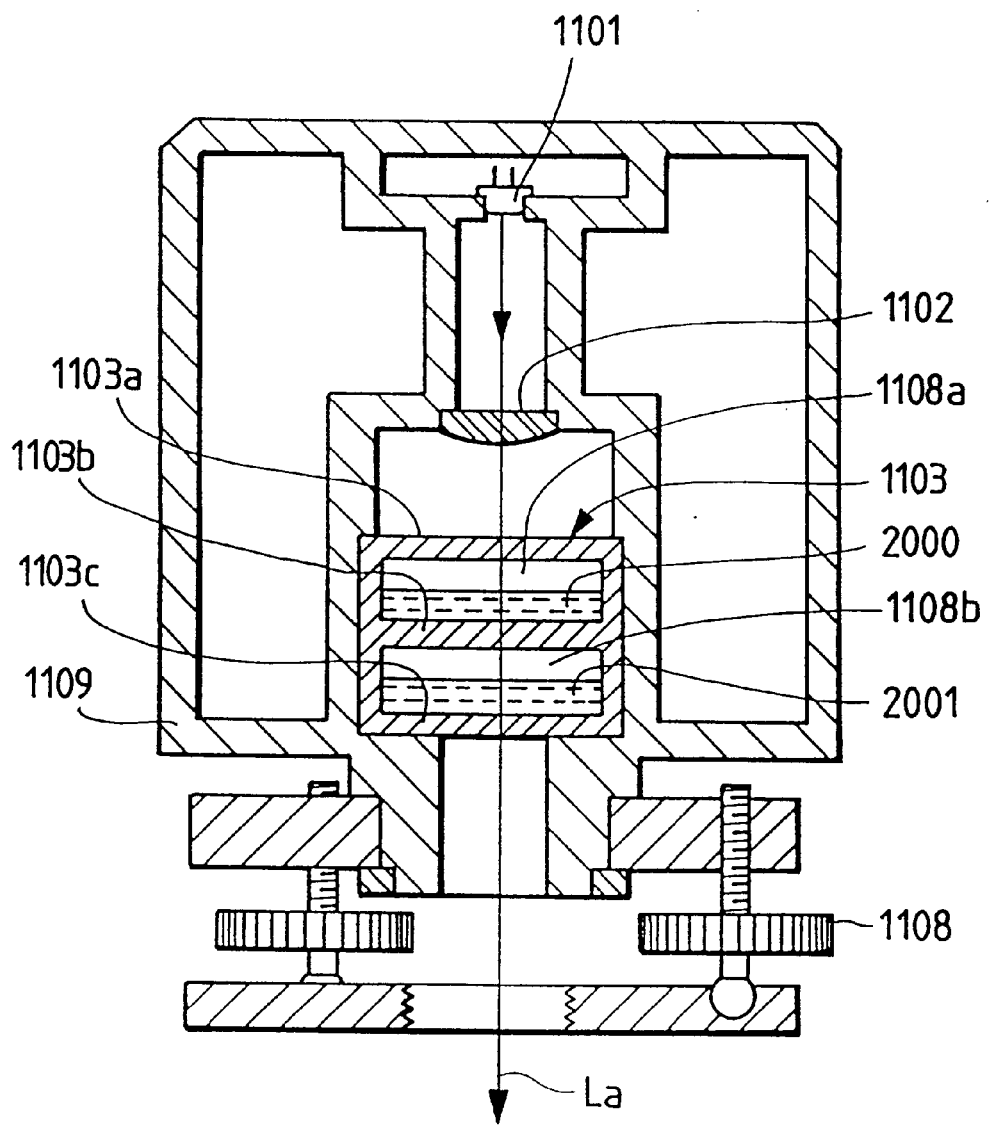
FIG. 16 is a longitudinal sectional view of a conventional laser beam projection apparatus having an automatic grade correction unit.
Figure 17:
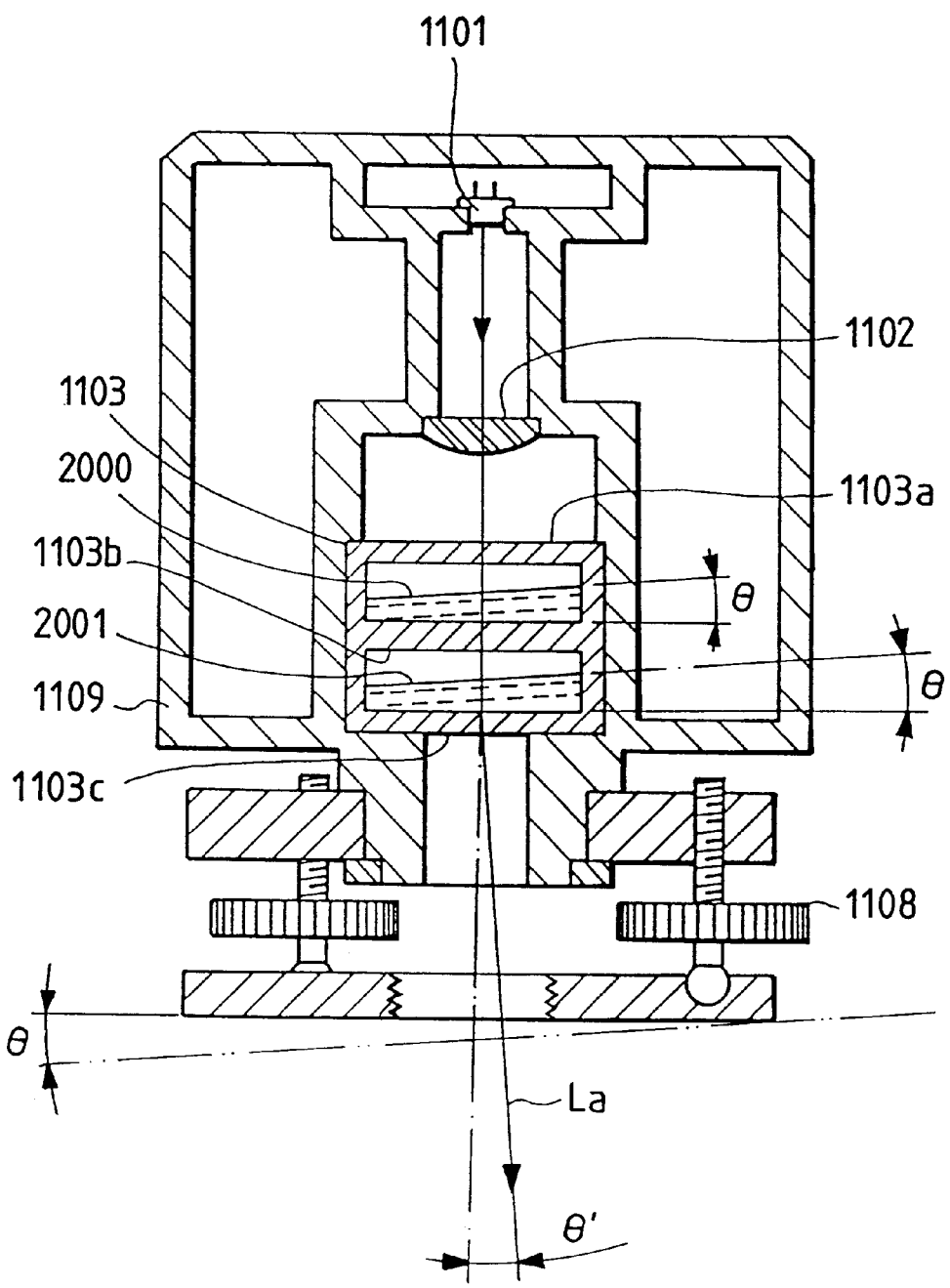
FIG. 17 is a longitudinal sectional view showing a state wherein the laser beam projection apparatus in FIG. 16 is tilted.

In the conventional automatic grade correction unit shown in FIGS. 16 and 17, existing silicone oil having a refractive index of, e.g., 1.41 must be used as the silicone oils 2000 and 2001 because there is no silicone oil having an appropriate viscosity and a proper refractive index of 1.500 for attenuating the vibration of the survey apparatus. For this reason, accurate grade correction cannot be performed.

However, according to the sixth embodiment, when the silicone oil C3 is selected from existing silicone oils in consideration of the viscosity necessary for attenuating the vibration of the survey apparatus, a refractive index n of the silicone oil C3, which is a parameter for correcting the tilt of the survey apparatus, can be set first. After this setting, the remaining parameters, i.e., the magnifications of the telescopes 505 and 506, for correcting the tilt of the survey apparatus can be set (in accordance with the refractive index n3) to satisfy Equations (24) and (28) above. Therefore, accurate grade correction can be performed.

More specifically, when the silicone oil C3 is selected from existing silicone oils in consideration of the viscosity necessary for attenuating the vibration of the survey apparatus to correct the tilt angle θ13 of the entire survey apparatus such that the laser beam L3" emerges from the concave lens 509 in the lower vertical direction, the refractive index n3 of the silicone oil C3, which is a parameter for correcting the tilt of the survey apparatus, can be set first. After this setting, the remaining parameter, i.e., the magnification (f23/f33) of the Galilean telescope 506, for correcting the tilt of the survey apparatus can be set (in accordance with the refractive index n3) to satisfy Equation (24) above.

In addition, after the refractive index n3 of the silicone oil C3 is set to correct the tilt angle θ13 of the entire survey apparatus such that the laser beam L3' emerges from the convex lens 507 in the upper vertical direction, the remaining parameter, i.e., the magnification (f13/f43) of the Keplerian telescope 505, for correcting the tilt of the survey apparatus can be set (in accordance with the refractive index n3) to satisfy Equation (28) above.

Figure 14:
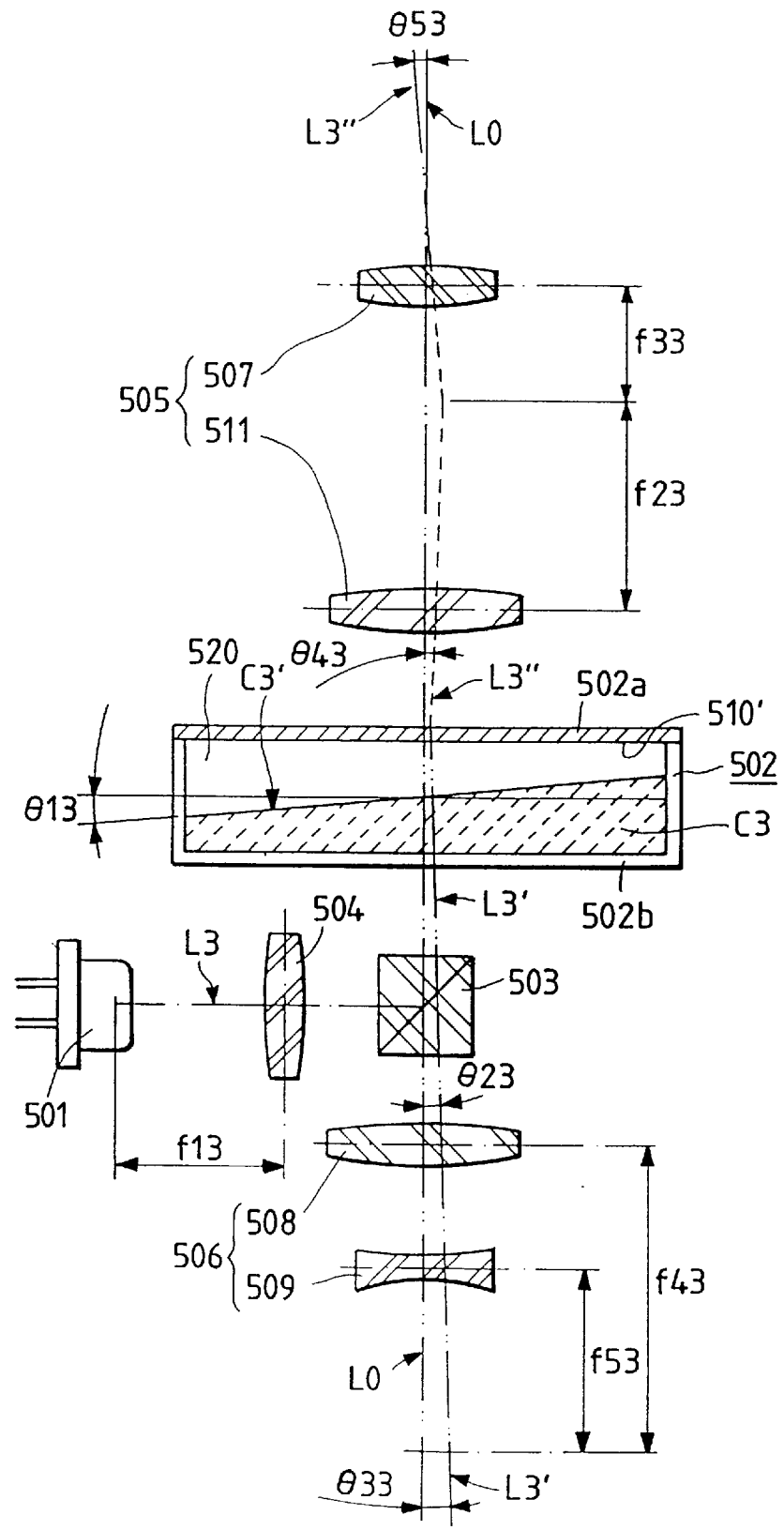
FIG. 14 is a view showing the overall arrangement of a laser beam projection apparatus according to the seventh embodiment.

FIG. 14 shows the automatic grade correction unit of a survey apparatus according to the seventh embodiment of the present invention. The same reference numerals as in the first embodiment denote the same members in FIG. 14, and a detailed description thereof will be omitted.

In the sixth embodiment, the half prism 503 is arranged between the convex lens (collimator lens 504) of the Keplerian telescope 505 and the convex lens 507. To the contrary, in the seventh embodiment, a half prism 503 is arranged between a convex lens 508 of a Galilean telescope 506 and a vessel 502, and a collimator lens 504 for collimating a laser beam L3 from a laser diode 501 into a parallel beam and directing the laser beam L3 to the half prism 503 is arranged. The optical axis of the collimator lens 504 is perpendicular to an optical axis L0 of the telescopes 505 and 506.

In the sixth embodiment, one of the two convex lenses constituting the Keplerian telescope 505 is also used as the collimator lens 504. However, in the seventh embodiment, the Keplerian telescope 505 is constituted by dedicated convex lenses 507 and 511. The convex lenses 507 and 511 have a positional relationship so that a laser beam L3" leaving the convex lens 507 becomes a parallel beam, as in the sixth embodiment. Note that f23 is the focal length of the convex lens 511, and f33 is the focal length of the convex lens 507. In addition, f43 and f53 represent the focal lengths of the convex lenses 508 and 509 of the Galilean telescope 506.

In the seventh embodiment, silicone oil C3 having a refractive index n3=1.40 is sealed in the vessel 502.

A half mirror 510' for splitting the laser beam incident from a lower wall portion 502b on the vessel 502 and transmitted through the silicone oil C3 into a light beam in the upper direction (transmission light) and a light beam in the lower direction (reflection light) is formed on the inner surface of an upper wall portion 502a of the vessel 502. The operation of the automatic grade correction unit according to the seventh embodiment having the above arrangement will be described below.

The laser beam L3 from the laser diode 501 is collimated by the collimator lens 504 into a parallel beam, reflected by the half prism 503 in the upper direction, and incident from the lower wall portion 502b on the vessel 502.

When the entire survey apparatus is tilted at an angle θ13, the vessel 502 is also tilted. Since a free liquid surface C3' of the silicone oil C3 remains horizontal, the silicone oil C3 forms a sphenoidal shape having a gradient pitch θ13 (a broken line portion in FIG. 14).

The laser beam L3 incident from the lower wall portion 502b on the vessel 502 and transmitted through the silicone oil C3 and the free liquid surface C3' is refracted by the sphenoidal silicone oil C3 and split by the half mirror 510' into a light beam in the upper direction and a light beam in the lower direction.

A laser beam (light beam in the upper direction) L3" transmitted through the half mirror 510' to almost halve the light amount is incident on the convex lens 511 of the Keplerian telescope 505 while being tilted at an angle θ43 approximately represented by Equation (21') below. The refractive index n3 of the silicone oil C3 is 1.40.

$$\theta 43=(n3-1)\cdot\theta 13=0.4\cdot\theta 13 \qquad \text{Equation (21')}$$

The tilt angle θ43 of the laser beam L3" is increased by a magnification according to the focal length f23 (f23=25 mm) of the convex lens 511 and the focal length f33 (f33=10 mm) of the convex lens 507, so that the laser beam becomes the laser beam L3" having an angle θ53 represented by Equation (22') below and emerges from the convex lens 507 in the upper vertical direction:

$$\theta 53=\theta 43\cdot f23/f33=2.5\cdot\theta 43 \qquad \text{Equation (22')}$$

That is, the angle θ53 subjected to automatic grade correction is obtained as follows by substituting Equation (21') into Equation (22'):

$$\theta 53=(n3-1)\cdot\theta 13\cdot f23/f33=\theta 13 \qquad \text{Equation (23')}$$

As is apparent from Equation (23'), the tilt angle θ13 of the entire survey apparatus must be equal to the angle θ53 after grade correction. Therefore, letting θ13=θ53, a grade correction condition formula represented by Equation (24') below is obtained:

$$f23/f33=1/(n3-1)=2.5 \qquad \text{Equation (24')}$$

On the other hand, the laser beam L3' (light beam in the lower direction) reflected by the half mirror 510' is transmitted through the silicone oil C3 and the free liquid surface C3' again and leaves the lower wall portion 502b of the vessel 502. The laser beam L3' at this time is transmitted through the half prism 503 and incident on the convex lens 508 of the Galilean telescope 506 while being tilted at an angle θ23 approximately given by the following Equation (25'):

$$\theta 23=(n3-1)\cdot\theta 13=0.8\cdot\theta 13 \qquad \text{Equation (25')}$$

The tilt angle θ23 of the laser beam L3' is increased by the magnification according to the focal length f43 (f43=25 mm) of the convex lens 508 and the focal length f53 (f53=20 mm) of the concave lens 509, so that the laser beam becomes the laser beam L3' having an angle θ33 represented by Equation (26') below and leaves the concave lens 509 in the lower vertical direction:

$$\theta 33=\theta 22\cdot f43/f53=1.25\cdot\theta 23 \qquad \text{Equation (26')}$$

That is, the angle θ33 subjected to automatic grade correction is obtained as follows by substituting Equation (25') into Equation (26'):

$$\theta 33=2(n3-1)\cdot\theta 13\cdot f43/f53 \qquad \text{Equation (27')}$$

As is apparent from Equation (27'), the tilt angle θ13 of the entire survey apparatus must be equal to the angle θ33 after grade correction. Therefore, letting θ13=θ33, a grade correction condition formula represented by the following Equation (28') is obtained:

$$f43/f53=\tfrac{1}{2}(n3-1)=1.25 \qquad \text{Equation (28')}$$

According to the seventh embodiment, this apparatus can be used for an ink projection operation performed in an interior finish work of a building or the like, and accurate grade correction can be performed, as in the sixth embodiment.

Figure 15:
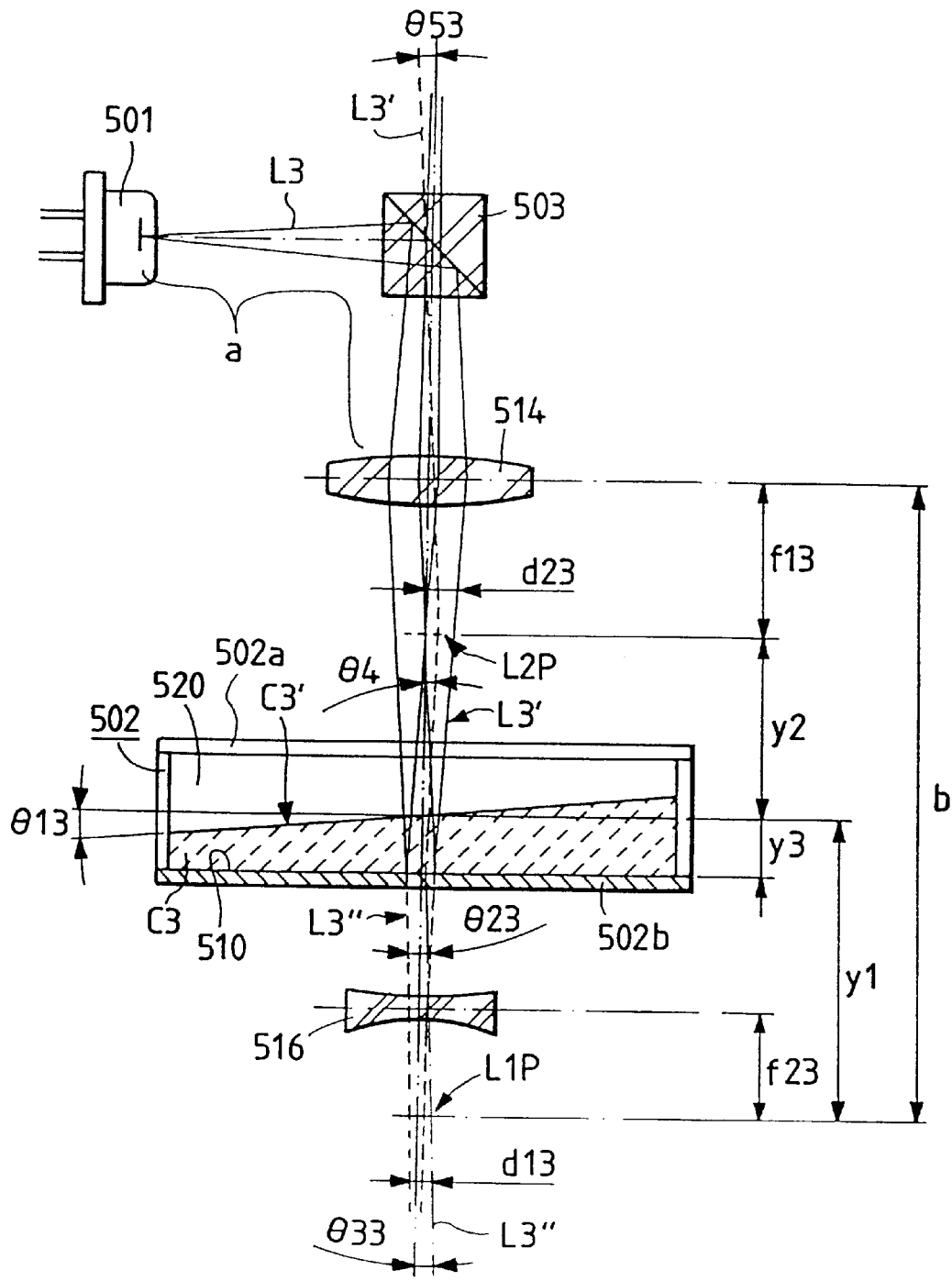
FIG. 15 is a view showing the overall arrangement of a laser beam projection apparatus according to the eighth embodiment.

FIG. 15 shows the automatic grade correction unit of a survey apparatus according to the eighth embodiment of the present invention. The same reference numerals as in the sixth embodiment denote the same members in FIG. 15, and a detailed description thereof will be omitted.

The automatic grade correction unit of the eighth embodiment comprises a condenser lens 514 for condensing a laser beam L3 emitted from a laser diode 501 and reflected by a half prism 503 downward at right angles and irradiating the laser beam on a vessel 502, a convex lens (also used as the condenser lens 514) for projecting an average image (a real image formed by a light beam near the optical axis at an imaging point L2P) formed by a light beam in the upper direction (laser beam L3'), which is obtained when the laser beam L3 is incident on the vessel 502 through the condenser lens 514 and reflected by the half mirror 510, and a concave lens 516 arranged to cause its optical axis to coincide with an optical axis L0 of the condenser lens 514 and project an average image (a virtual image formed by a paraxial light beam at an imaging point L1P) formed by a light beam in the lower direction (laser beam L3"), which is obtained when the laser beam L3 is incident on the vessel 502 through the condenser lens 514 and transmitted through the half mirror 510.

The laser diode 501 is arranged at a position perpendicular to the optical axis L0 of the condenser lens 514 and separated from the condenser lens 514 by a distance a through the half mirror 503.

The half mirror 510 transmits about 30% of the light amount of an incident light beam and reflects about 70% of the light amount.

A free liquid surface C3' of silicone oil C3 is at a position separated from the average imaging point L1P by a distance y1.

The concave lens 516 is arranged to cause a focal length f23 to coincide with the average imaging point L1P such that a parallel beam (laser beam L3") emerges from this lens in the lower vertical direction.

The laser beam L3 emitted from the laser diode 501 is incident on the vessel 502 through the half prism 503 and the condenser lens 514, reflected by the half mirror 510, and emerges from the vessel 502 in the upper direction. The light beam in the upper direction (laser beam L3') forms a real image at the average imaging point L2P. The average imaging point L2P is at a position separated from the free liquid surface C3' by a distance y2.

The condenser lens 514 is arranged to cause a focal length f13 to coincide with the average imaging point L2P such that a parallel beam (laser beam L3') emerges from this lens in the upper vertical direction.

The operation of the automatic grade correction unit according to the eighth embodiment having the above arrangement will be described below.

The laser beam L3 from the laser diode 501 is reflected by the half prism 503, condensed by the condenser lens 514, and irradiated on the vessel 502.

When the entire survey apparatus is tilted at an angle θ13, the vessel 502 is also tilted. Since the free liquid surface C3' of the silicone oil C3 in the vessel 502 remains horizontal, the silicone oil C3 forms a sphenoidal shape having a gradient pitch θ13 (a broken line portion in FIG. 15).

The laser beam L3 incident from an upper wall portion 502a on the vessel 502 and transmitted through the free liquid surface C3' and the silicone oil C3 is refracted by the sphenoidal silicone oil C3 and split by the half mirror 510 into a light beam in the upper direction (reflection light) and a light beam in the lower direction (transmission light).

The laser beam (light beam in the lower direction) L3" transmitted through the half mirror 510 to decrease the light amount to about 30% is incident on a concave lens 516 while being tilted at the angle θ23 approximately represented by the following Equation (30):

$$\theta 23 = (n3-1)\cdot\theta 13 \qquad \text{Equation (30)}$$

The laser beam (light beam in the lower direction) L3" forms a virtual image at the average imaging point L1P at a position separated from the condenser lens 514 by a distance b. The relationship between the distances a and b, and the focal length f13 is represented as follows:

$$1/f13 = (1/a)+(1/b)$$

At this time, the position of the imaging point L1P shifts from the optical axis L0 in the horizontal direction by a distance d13:

$$d13 = y1\cdot\text{Tan }\theta 23 \qquad \text{Equation (31)}$$

The angle of the laser beam L3" is changed by the concave lens 516, so that the laser beam becomes a parallel beam (laser beam L3") having an angle θ33 represented by Equation (32) below and emerges from the concave lens 516 in the lower vertical direction:

$$\theta 33 = \text{Tan}^{-1}(d13/f23) \qquad \text{Equation (32)}$$

That is, the angle θ33 subjected to automatic grade correction is obtained as follows by substituting Equations (30) and (31) into Equation (32):

$$\theta 33 = \text{Tan}^{-1}[(y1\cdot\text{Tan}((n3-1)\cdot\theta 13))/f23] \qquad \text{Equation (33)}$$

As is apparent from Equation (33), the tilt angle θ13 of the entire survey apparatus must be equal to the angle θ33 after grade correction. Therefore, letting θ13=θ33=θ, $$f23/y1 = [\text{Tan}((n3-1)\cdot\theta)]/\text{Tan }\theta \qquad \text{Equation (34)}$$

If the range of θ is small (e.g., 1° or less), a grade correction condition formula represented by the following Equation (35) is obtained:

$$y1/f23 = 1/(n3-1) \qquad \text{Equation (35)}$$

On the other hand, the laser beam L3' (light beam in the upper direction) reflected by the half mirror 510 is transmitted through the silicone oil C3 and the free liquid surface C3' again and leaves the upper wall portion 502a of the vessel 502. The laser beam L3' at this time is tilted at an angle θ43 approximately given by Equation (36) below and forms a real image at the average imaging point L2P:

$$\theta 43 = (n3-1/n3)\cdot\theta 13 \qquad \text{Equation (36)}$$

At this time, the position of the average imaging point L2P shifts from the optical axis L0 by a distance d23:

$$d23 = y2 \cdot \tan\theta 43 \qquad \text{Equation (37)}$$

The angle of the laser beam L3" is changed by the condenser lens 514, so that the laser beam becomes a parallel beam (laser beam L3") having an angle θ53 represented by Equation (38) below and emerges from the condenser lens 514 in the upper vertical direction:

$$\theta 53 = \tan^{-1}(d23/f13) \qquad \text{Equation (38)}$$

That is, the angle θ53 subjected to automatic grade correction is obtained as follows by substituting Equations (36) and (37) into Equation (38):

$$\theta 53 = \tan^{-1}[(y2 \cdot \tan((n3-1/n3) \cdot \theta 13))/f13] \qquad \text{Equation (39)}$$

As is apparent from Equation (39), the tilt angle θ13 of the entire survey apparatus must be equal to the angle θ53 after grade correction. Therefore, letting θ13=θ53=θ, $$f13/y2 = [\tan((n3-1/n3) \cdot \theta)]/\tan\theta \qquad \text{Equation (40)}$$

If the range of θ is small (e.g., 1° or less), a grade correction condition formula represented by Equation (41) is obtained:

$$y2/f13 = 1/(n3-1/n3) \qquad \text{Equation (41)}$$

The condenser lens 514 and the convex lens for projecting the image (the real image formed at the average imaging point L2P) formed by the laser beam L3' are constituted by an identical member. Therefore, the distance b from the condenser lens 514 to the imaging point L1P must be given by:

$$b = f13 + 2 \cdot y2 + 2 \cdot y3 \qquad \text{Equation (42)}$$

where y3 is the depth of the silicone oil C3, and apparently y3=(depth of silicone oil C3)/n3. For example, when the depth of the silicone oil C3 is 3 mm, and n3=1.4, the optical depth y3 (y3=C3/n3) is about 2.143 mm.

Therefore, y2 is given by:

$$y2 = (b - f13 - 2 \cdot y3)/2 \qquad \text{Equation (43)}$$

In addition, y1 is given by:

$$y1 = b - (f13 + y2) \qquad \text{Equation (44)}$$

(y1 is calculated also taking apparent y3=(depth of C3)/n3 into consideration).

When the refractive index n3 of the silicone oil C3 is set at 1.4, the following relations are obtained from Equations (35) and (41):

$$y1/f23 = 2.5$$

$$y2/f13 = 1.4583$$

When the focal length f13 of the condenser lens 514 is set as f13=15 mm, and the focal length f23 of the concave lens 516 is set as f23=10 mm, y1 and y2 are obtained as follows, respectively:

$$y1 = 25 \text{ mm}, y2 = 21.875 \text{ mm}$$

y3 is obtained from Equations (43) and (44) as:

$$y3 = (y1 - y2)/2 = 1.563 \text{ mm}$$

Therefore, b is calculated as b=61.875 mm from Equation (42), and a is calculated as a=19.8 mm.

In this manner, a detailed arrangement corresponding to the grade correction condition formulas of Equations (35) and (41) can be realized.

According to the eighth embodiment, both the light beam in the lower vertical direction (laser beam L3") and the light beam in the upper vertical direction (laser beam L3') can simultaneously be output after the tilt angle θ13 of the entire survey apparatus is corrected, as in the sixth and seventh embodiments. Therefore, this apparatus can be used for an ink projection operation performed in an interior finish work of a building or the like.

In addition, the refractive index n3 of the silicone oil C3, which is a parameter for correcting any tilt of the survey apparatus, can be set first. After this setting, the remaining parameters can be set (in accordance with the refractive index n3) to satisfy Equations (35) and (41). Therefore, accurate grade correction can be performed.

What is claimed is:

1. A laser beam projection apparatus comprising:

a light source;

a first optical member which collimates a light beam from said light source into a first parallel beam;

a vessel containing a transparent liquid with a refractive index n and having a free liquid surface, which transmits said first parallel light beam;

a condensing optical member with a first focal length which condenses light transmitted through said vessel and liquid to form a secondary source of said light source; and a second optical member with a second focal length which collimates the light beam from said secondary source into a second parallel light beam, wherein the ratio of the second focal length to the first focal length is (n−1).

2. An apparatus according to claim 1, further comprising a third optical member which inverts the direction of said second parallel light beam.

3. An apparatus according to claim 1, wherein said vessel has an optical path deflecting member which deflects the parallel beam incident on said vessel at a right angle, and said condensing optical member condenses one of, (1) the parallel beam deflected by said optical path deflecting member at a right angle and transmitted through said free liquid surface of said liquid, and (2) the parallel beam transmitted through said free liquid surface of said liquid and deflected by said optical path deflecting member at a right angle, thereby forming said secondary source of said light source, and wherein said apparatus further comprises a reflecting optical member which outputs the parallel beam from said second optical member in an orthogonal direction.

4. A laser beam projection apparatus comprising:

a first optical member which collimates a light beam from a light source into a parallel beam;

a second optical member which deflects the parallel beam from said first optical member at a right angle;

a first vessel arranged on an incident side of said second optical member and containing a first transparent liquid having a free liquid surface;

a second vessel arranged on an exit side of said second optical member and containing a second transparent liquid having a free liquid surface;

a condensing optical member which condenses the parallel beam from said second optical member, that is selectively transmitted through only one of the free liquid surfaces of said first and second liquids, to form a secondary source of said light source;

a third optical member which collimates the light beam from said secondary source into a parallel beam; and a projection device which projects the parallel beam from said third optical member, wherein focal lengths of said condensing optical member and said third optical member are set in accordance with a refractive index of said liquid such that the parallel beam from said third optical member emerges in one of a vertical and a horizontal direction.

* * * * *